US012222050B2

(12) United States Patent
Sams et al.

(10) Patent No.: US 12,222,050 B2
(45) Date of Patent: Feb. 11, 2025

(54) ROBUST FLUID COUPLING APPARATUS

(71) Applicant: ASML Netherlands B.V., Veldhoven (NL)

(72) Inventors: Benjamin Andrew Sams, San Diego, CA (US); Dietmar Uwe Herbert Trees, San Diego, CA (US); Vikas Giridhar Telkar, Escondido, CA (US); Alexander Igorevich Ershov, Escondido, CA (US); Theodorus Wilhelmus Driessen, San Diego, CA (US); Serkan Kincal, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 57 days.

(21) Appl. No.: 18/010,312

(22) PCT Filed: Jul. 13, 2021

(86) PCT No.: PCT/EP2021/069426
§ 371 (c)(1),
(2) Date: Dec. 14, 2022

(87) PCT Pub. No.: WO2022/017866
PCT Pub. Date: Jan. 27, 2022

(65) Prior Publication Data
US 2023/0279974 A1 Sep. 7, 2023

Related U.S. Application Data

(60) Provisional application No. 63/054,410, filed on Jul. 21, 2020, provisional application No. 63/167,254,
(Continued)

(51) Int. Cl.
*F16L 17/06* (2006.01)
*F16L 17/02* (2006.01)
*H05G 2/00* (2006.01)

(52) U.S. Cl.
CPC .............. *F16L 17/02* (2013.01); *H05G 2/006* (2013.01); *H05G 2/008* (2013.01)

(58) Field of Classification Search
CPC . F16L 19/02; F16L 23/16; F16L 23/18; F16L 23/22; F16L 23/02; F16L 23/024; F16L 17/02; F16L 17/06; F16L 17/067
See application file for complete search history.

(56) References Cited

U.S. PATENT DOCUMENTS

| 489,107 A | 1/1893 | Storz |
|---|---|---|
| 2,766,998 A | 10/1956 | Watts et al. |

(Continued)

FOREIGN PATENT DOCUMENTS

| CH | 3134 A | 6/1891 |
|---|---|---|
| WO | 2014001057 A1 | 1/2014 |

OTHER PUBLICATIONS

European International Searching Authority, International Search Report and Written Opinion, counterpart PCT Application No. PCT/EP2021/069426, mailed Dec. 22, 2021, 25 pages.

(Continued)

*Primary Examiner* — Aaron M Dunwoody
(74) *Attorney, Agent, or Firm* — DiBerardino McGovern IP Group LLC

(57) ABSTRACT

A target material supply apparatus includes: first and second fluid flow components (1122, 1126) that define an axial flow path when joined together, in which the axial flow path is between a source of target material fluid and a nozzle supply apparatus; and a coupling apparatus configured to seal the joint between the first and second fluid flow components. The coupling apparatus includes a gasket (1105) having an annular shape defining an inner opening that is a part of the axial flow path when seated and sealed. When the gasket is seated between the first and second fluid flow components to thereby seal the joint formed by attaching the first and second fluid flow components, pressure applied to the gasket from target material fluid traversing the gasket inner opening along the axial flow path improves the hermetic function of (Continued)

the seal at the joint. Optionally, a functional insert like e.g. a flow restrictor (1160) can be seated in the gasket.

25 Claims, 17 Drawing Sheets

Related U.S. Application Data filed on Mar. 29, 2021, provisional application No. 63/216,820, filed on Jun. 30, 2021.

(56) References Cited

U.S. PATENT DOCUMENTS

| | | | | |
|---|---|---|---|---|
| 5,088,773 | A | * | 2/1992 | Gralenski ........... F16L 19/0212 |
| | | | | 285/353 |
| 2011/0031702 | A1 | * | 2/2011 | Wilson ................. F16L 19/028 |
| | | | | 277/608 |
| 2014/0209817 | A1 | * | 7/2014 | Hultermans ........... H05G 2/006 |
| | | | | 250/492.1 |
| 2017/0059064 | A1 | * | 3/2017 | Thrift ................... F16L 23/032 |

OTHER PUBLICATIONS

Anonymous author, "Feuerwehrkupplung", Wikipedia XP055851125; https://de.wikipedia.org/w/index.php?title=Feuerwehrkupplung&olddid=200391881, published on May 27, 2020, 7 pages.

Anonymous author, "Silicone", Wikipedia XP055851159; https://de.wikipedia.org/w/index.php?title=Silicone&oldid=967708610, published on Jul. 14, 2020, 12 pages.

Anonymous author, "Feuerwehrschlauch", Wikipedia XP055851135; https://de.wikipedia.org/w/index.php?title=Feuerwehrschlauch&oldid=211864690, published on May 12, 2021, 7 pages.

Anonymous author, "Feuerwehrschlauch", Wikipedia; https://de.wikipedia.org/w/index.php?title=Feuerwehrschlauch&direction=prev&oldid=201558170, published on Apr. 12, 2020, 7 pages.

* cited by examiner

ROBUST FLUID COUPLING APPARATUS

CROSS REFERENCE TO RELATED APPLICATIONS

This application claims priority to U.S. Application No. 63/054,410, filed Jul. 21, 2020, titled ROBUST FLUID COUPLING APPARATUS; and U.S. Application No. 63/167,254, filed Mar. 29, 2021, titled ROBUST FLUID COUPLING APPARATUS, and U.S. Application No. 63/216,820 filed on Jun. 30, 2020, titled ROBUST FLUID COUPLING APPARATUS, all of which are incorporated herein in their entireties by reference.

TECHNICAL FIELD

The disclosed subject matter relates to an apparatus for fluidly coupling two fluid flow components, the apparatus including a gasket.

BACKGROUND

Extreme ultraviolet (EUV) light, for example, electromagnetic radiation having wavelengths of 100 nanometers (nm) or less (also sometimes referred to as soft x-rays), and including light at a wavelength of, for example, 20 nm or less, between 5 and 20 nm, or between 13 and 14 nm, can be used in photolithography processes to produce extremely small features in substrates, for example, silicon wafers, by initiating polymerization in a resist layer. Methods for generating EUV light include, but are not limited to, altering the physical state of a source material to a plasma state. The source material includes a compound or an element, for example, xenon, lithium, or tin, with an emission line in the EUV range. In one such method, often termed laser produced plasma ("LPP"), the required plasma is produced by irradiating a source material, for example, in the form of a droplet, stream, or cluster of source material, with an amplified light beam that can be referred to as a drive laser. For this process, the plasma is typically produced in a sealed vessel, for example, a vacuum chamber, and monitored using various types of metrology equipment. The source material, such as xenon, lithium, or tin, which emit in the EUV range when in the plasma state, are commonly referred to as target material since they are targeted and irradiated by the drive laser.

SUMMARY

In some general aspects, a target material supply apparatus includes: first and second fluid flow components that define an axial flow path when joined together, in which the axial flow path is between a source of target material fluid and a nozzle supply apparatus and is configured to pass the target material fluid toward the nozzle supply apparatus; and a coupling apparatus configured to seal a joint between the first and second fluid flow components. The coupling apparatus includes a gasket having an annular shape defining an inner opening that is a part of the axial flow path when seated and sealed. When the gasket is seated between the first and second fluid flow components to thereby seal the joint formed by attaching the first and second fluid flow components, pressure applied to the gasket from target material fluid traversing the gasket inner opening along the axial flow path improves the hermetic function of the seal at the joint.

Implementations can include one or more of the following features. For example, the gasket can be configured to be demountable from the joint without damaging the joint. At least one surface of the gasket extending in a radial plane can be configured to engage with a protrusion of the adjacent fluid flow component after an outer radial mating surface of the gasket has engaged with an inner radial mating surface of the adjacent fluid flow component.

The first fluid flow component can be an adapter and the second fluid flow component can be a target material fluid reservoir, the adapter being positioned between the target material fluid reservoir and the nozzle supply apparatus. The adapter can be made of molybdenum rhenium and the gasket is made of polyimide.

The target material supply apparatus can further include a functional insert that is seated within the inner opening of the gasket, the functional insert including an inner opening that is part of the axial flow path, the functional insert inner opening having a diameter that is less than the diameter of the inner opening of the gasket. The functional insert can be made of a material that is compatible with the target material fluid. The functional insert can be a flow restrictor that is made of tantalum; tungsten; molybdenum; an alloy of tantalum, tungsten, or molybdenum; polyimide; or a refractory metal. The functional insert can be made of boron carbide or a metal coated with a tin-phobic material. The target material fluid can be molten tin. The diameter of the inner opening of the gasket can be at least as large as an inner opening of the adapter that defines the axial flow path, and can be small enough to axially support the functional insert therewithin. The functional insert can be a flow restrictor and the diameter of its inner opening can be small enough to allow a restricted flow of target material fluid upon application of a flow pressure of the target material fluid that exceeds a threshold, can be smaller than a diameter of the axial flow path, and can be larger than the smallest diameter of a flow path of the nozzle supply apparatus. The functional insert can be a flow restrictor, the first fluid flow component can be an adapter, and the second fluid flow component can be a target material fluid reservoir, the adapter being positioned between the target material fluid reservoir and the nozzle supply apparatus.

In other general aspects, a coupling apparatus is configured to seal a joint between two fluid flow components that, when joined, define an axial flow path through which a fluid can traverse. The coupling apparatus includes: a gasket having an annular shape that defines an inner opening having a diameter taken along a radial plane that is perpendicular to the axial flow path, the inner opening diameter of the gasket being large enough to enable fluid to pass through the gasket, wherein the gasket inner opening extends the axial flow path; and a support component in which the gasket is arranged. The support component has an annular shape that defines an inner opening having a diameter taken along the radial plane, the inner opening diameter of the support component being larger than an outer diameter of the gasket. When the gasket is seated between the two fluid flow components to thereby seal the joint formed by attaching the two fluid flow components, pressure applied to the gasket from fluid traversing the gasket inner opening along the axial flow path improves the hermetic function of the seal at the joint.

Implementations can include one or more of the following features. For example, the gasket can extend the axial flow path between the two fluid flow components. The gasket can have a cross-sectional shape having an axial extent that is closest to the axial flow path that is greater than an axial extent that is farthest from the axial flow path.

The support component can be a part of one or more of the fluid flow components or a separate support ring. The support component can be made of a material that is harder than the material of the gasket.

A cross-sectional shape of the gasket can be T-shaped. The gasket can be made of a polyimide. The gasket can be axially symmetric.

As the joint between the fluid flow components is tightened, the joint seal can be initially formed between an inner radial mating surface of at least one of the fluid flow components and an outer radial mating surface of the gasket prior to the joint seal being formed along the axial direction between the fluid flow components and the gasket.

The two fluid flow components can be tubes that both define respective inner diameters that define the axial flow path. Or, a first of the fluid flow components can be a tube that defines the inner diameter that defines the axial flow path and a second of the fluid flow components can be a fluid stop device that is configured to prevent fluid from passing. A first fluid flow component can be an adapter and a second fluid flow component can be a target material fluid reservoir, the adapter being positioned between the target material fluid reservoir and a nozzle supply apparatus. The adapter can be made of molybdenum rhenium and the gasket can be made of polyimide.

The coupling apparatus can further include a functional insert that is seated within the inner opening of the gasket, the functional insert including an inner opening that is part of the axial flow path, the functional insert inner opening having a diameter that is less than the diameter of the inner opening of the gasket. The functional insert can be made of a material that is compatible with the target material fluid. The functional insert can be made of tantalum; tungsten; molybdenum; an alloy of tantalum, tungsten, or molybdenum; a refractory metal; or polyimide. The functional insert can be made of boron carbide or a metal coated with a tin-phobic material. The diameter of the inner opening of the gasket can be at least as large as an inner opening of the adapter that defines the axial flow path, and small enough to axially support the functional insert therewithin. The functional insert can be a flow restrictor, and diameter of its inner opening can be small enough to allow a restricted flow of target material fluid upon application of a flow pressure of the target material fluid that exceeds a threshold, can be smaller than a diameter of the axial flow path, and can be larger than the smallest diameter of a flow path of the nozzle supply apparatus. The functional insert can be a flow restrictor, the first fluid flow component can be an adapter, and the second fluid flow component can be a target material fluid reservoir, the adapter being positioned between the target material fluid reservoir and the nozzle supply apparatus.

In other general aspects, a target material supply apparatus includes: first and second fluid flow components that define an axial flow path when joined together, in which the axial flow path is between a source of target material fluid and a nozzle supply apparatus and is configured to pass the target material fluid toward the nozzle supply apparatus; and a coupling apparatus configured to seal the joint between the first and second fluid flow components. The coupling apparatus includes a gasket made of a material other than metal or metal alloys and is compatible with and inert to the target material fluid.

Implementations can include one or more of the following features. For example, target material fluid can include molten tin and the gasket can be made of polyimide. The gasket can be made of a material that retains its sealing properties at temperatures greater than 200° C. and at fluid flow pressures greater than 3000 PSI. The gasket can be made of a material that retains its sealing properties at fluid flow pressures greater than 10,000 PSI. The gasket can be seated between the first and second fluid flow components such that the seal formed by the gasket improves as the fluid flow pressure is increased.

The target material supply apparatus can further include a support component within which the gasket is arranged, the support component configured to provide a hard stop along the direction of the axial flow path. The support component can have a coefficient of thermal expansion that is compatible with the coefficient of thermal expansion of the material of the first and second fluid flow components. The target material supply apparatus can further include a support component within which the gasket is arranged, the support component configured to prevent the gasket from extruding away from the axial flow path and failing to maintain the seal, the support component being made of a material that is stronger than the material of the gasket. The target material supply apparatus can further include a support component within which the gasket is arranged, the support component being made of a nickel-cobalt ferrous alloy or an alloy of one or more of: nickel, cobalt, iron, titanium, aluminum, magnesium, copper, molybdenum, and tungsten. The target material supply apparatus can further include a support component within which the gasket is arranged, the support component being made of a material that has a stiffness that is 2-100 times greater than the stiffness of the material of the gasket.

A first fluid flow component can be an adapter and a second fluid flow component can be a target material fluid reservoir, the adapter being positioned between the target material fluid reservoir and the nozzle supply apparatus. The adapter can be made of molybdenum rhenium and the gasket can be made of polyimide.

The target material supply apparatus can further include a functional insert that is seated within the inner opening of the gasket, the functional insert including an inner opening that is part of the axial flow path, the functional insert inner opening having a diameter that is less than the diameter of the inner opening of the gasket. The functional insert can be made of a material that is compatible with the target material fluid. The functional insert can be made of tantalum; tungsten; molybdenum; an alloy of tantalum, tungsten, or molybdenum; a refractory metal; or polyimide. The functional insert can be made of boron carbide or a metal coated with a tin-phobic material. The diameter of the inner opening of the gasket can be at least as large as an inner opening of the adapter that defines the axial flow path, and can be small enough to axially support the functional insert therewithin. The functional insert can be a flow restrictor, and the diameter of its inner opening can be small enough to allow a restricted flow of target material fluid upon application of a flow pressure of the target material fluid that exceeds a threshold, can be smaller than a diameter of the axial flow path, and can be larger than the smallest diameter of a flow path of the nozzle supply apparatus. The first fluid flow component can be an adapter and the second fluid flow component can be a target material fluid reservoir, the adapter being positioned between the target material fluid reservoir and the nozzle supply apparatus.

In other general aspects, a coupling apparatus is configured to seal a joint between a reservoir that holds a target material fluid and an adapter configured to fluidly connect the reservoir to a nozzle supply apparatus, the coupling apparatus extending an axial flow path through which the target material fluid can traverse from the reservoir to the nozzle supply apparatus. The coupling apparatus includes: a gasket having an annular shape that defines an inner opening having a diameter taken along a radial plane that is perpendicular to the axial flow path, the inner opening diameter of the gasket being large enough to enable fluid to pass through the gasket, wherein the gasket inner opening extends the axial flow path; and a functional insert that is seated within the inner opening of the gasket. The functional insert includes an inner opening that is part of the axial flow path. The functional insert inner opening has a diameter that is less than the diameter of the inner opening of the gasket. When the gasket is seated between the reservoir and the adapter to thereby seal the joint formed by attaching the reservoir and the adapter, pressure applied to the gasket from fluid traversing the gasket inner opening along the axial flow path improves the hermetic function of the seal at the joint.

Implementations can include one or more of the following features. For example, the coupling apparatus can further include a support component in which the gasket is arranged, the support component having an annular shape that defines an inner opening having a diameter taken along the radial plane, the inner opening diameter of the support component being larger than an outer diameter of the gasket.

In other general aspects, a separating coupling apparatus is configured to seal a joint between first and second fluid flow components, the separating coupling apparatus extending an axial flow path through which a target material fluid can traverse from a reservoir to a nozzle supply apparatus. The separating coupling apparatus includes a separating gasket having an annular shape that defines an inner opening having a diameter taken along a radial plane that is perpendicular to the axial flow path, the inner opening diameter of the separating gasket being large enough to enable fluid to pass through the separating gasket. The gasket inner opening extends the axial flow path. The separating gasket is made of a material that is phobic to and compatible with the target material fluid. When the separating gasket is seated between the first and second fluid flow components to thereby seal the joint formed by attaching the first fluid flow component and the second fluid flow component, pressure applied to the separating gasket from fluid traversing the gasket inner opening along the axial flow path improves the hermetic function of the seal at the joint.

DESCRIPTION

Figure 1:
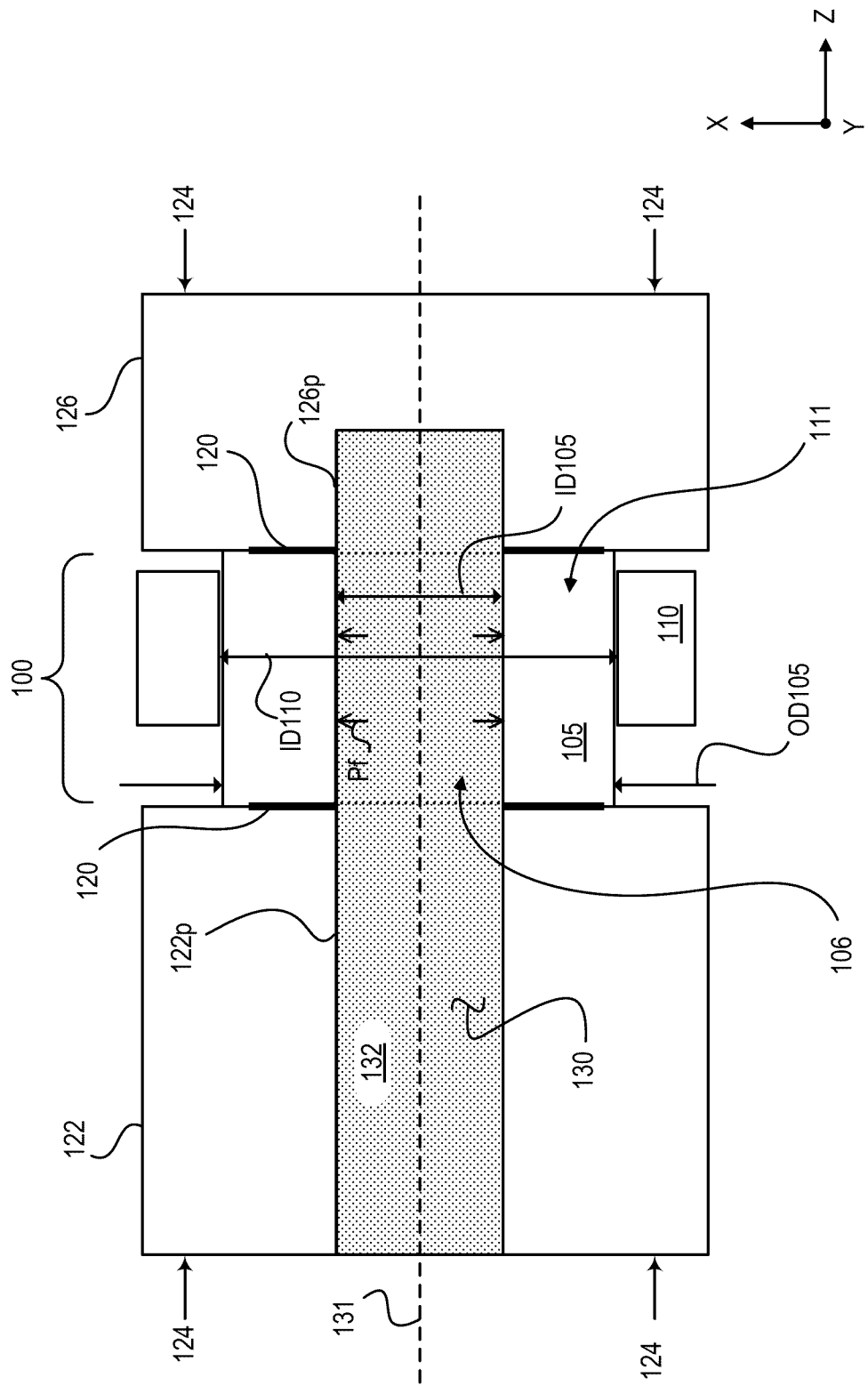
FIG. 1 is a block diagram of a coupling apparatus configured to seal a joint between first and second fluid flow components defining an axial flow path through which a fluid can traverse.

Referring to FIG. 1, a coupling apparatus 100 is configured to seal a joint 120 between first and second fluid flow components 122, 126. The joint 120 is formed by attaching the first and second fluid flow components 122, 126 upon application of a force 124 applied along an axial direction 131, which is parallel with a Z axis of an X, Y, Z Cartesian coordinate system. The joint 120 can be a demountable connection, which means that it is made up of components that are detachable from each other. Any suitable mechanical device or devices can be used to provide the force 124. In some implementations, the mechanical device is demountable or detachable, which means it forms a joint 120 that is not permanent. In this way, the force 124 applied by the mechanical device can be removed without damaging the joint 120. For example, the force 124 can be applied using threaded fasteners, pins, retaining rings, or clamps. The first and second fluid flow components 122, 126 define an axial flow path 130 through which a fluid 132 can traverse. The axial flow path 130 extends along the axial direction 131. The coupling apparatus 100 is robust and the functionality of the coupling apparatus 100 improves as a pressure of the fluid 132 that traverses the axial flow path 130 increases. The coupling apparatus 100 is a passive device, which means that no additional energy is required for the coupling apparatus 100 to operate as a sealing mechanism. In this way, the coupling apparatus 100 provides a passive pressure energized seal.

The coupling apparatus 100 includes a gasket 105 and a support component 110. The gasket 105 has an annular shape, in which the center of the shape aligns with the axial direction 131. Specifically, a cross section of the gasket in the radial plane (the X-Y plane) is in the shape of an annulus. This annular shape of the gasket 105 defines an inner opening 106, in which a diameter ID105 of the inner opening 106 is taken along the radial plane (the X-Y plane), which is perpendicular to the axial direction 131. The diameter ID105 of the inner opening 106 is large enough to enable fluid 132 to pass through the gasket 105 (that is, through the inner opening 106 of the gasket 105). The inner opening 106 extends the axial flow path 130 of either or both of the first and second fluid flow components 122, 126.

The gasket 105 is arranged in the support component 110. The support component 110 has an annular shape, to match or complement the shape of the gasket 105. The support component 110 defines an inner opening 111 having a diameter ID110 taken along the radial plane (the X-Y plane), the diameter ID110 being larger than an outer diameter OD105 of the gasket 105. When the gasket 105 is seated between the first and second fluid flow components 122, 126 and the joint 120 is formed by attaching the first and second fluid flow components 122, 126 upon application of the force 124, pressure Pf that is applied to the gasket 105 from any fluid 132 traversing the inner opening 106 improves the hermetic function of the seal at the joint 120. Specifically, this means that as the pressure Pf increases, the seal at the joint 120 becomes better able to prevent the passage of fluid 132 through the joint. Thus, as the pressure Pf increases, leakage of fluid 132 through the joint 120 is reduced. The pressure Pf applied to the gasket 105 due to the flow of the fluid 132 through the joint 120 is distinct from the pressure applied to the gasket 105 due to the force 124 applied to the first and second fluid flow components 122, 126. In other words, the pressure Pf applied to the gasket 105 arises from the force of the fluid 132 through the joint 120, not the force 124 applied to the first and second fluid flow components.

The gasket 105 is robust against defects and process. This means that the material of the gasket 105 is better able to comply and deform to account for variations in the materials at the joint 120 and to better seal against such variations (much like a rubber compound). But, the material of the gasket 105 has properties that make it more suitable than rubber compounds traditionally used in rubber O-Rings. For example, the material of the gasket 105 is stronger than a common rubber O-Ring. The material of the gasket 105 is thermally stable, which means its sealing properties do not change significantly with changes in temperature that occur at the joint 120, such temperature changes occurring in part due to the temperature at which the fluid 132 is maintained (to keep the fluid 132 in a non-solid form). The design and material of the gasket 105 is such that tightening of the joint 120 is a more robust process, producing more consistent joints 120 that are within torque and rotation specifications. The gasket 105 is able to withstand greater elastic strain, and can accommodate several micrometers of fitting expansion, which can occur when the pressure Pf increases or from external loads such as applied as the force 124.

The gasket 105 is made of a material that is compatible with and not reactive to the material of the fluid 132 that comes in contact with the gasket 105. Additionally, the material of the gasket 105 is able to withstand the temperature at which the fluid 132 needs to be maintained. For example, if the fluid 132 includes liquid tin, then the gasket 105 should be made of a material that can withstand operating temperatures of at least 200° C. because tin melts at 232° C. and is maintained at 260° C. to ensure it remains in the form of a liquid. The material of the gasket 105 should be able to withstand the pressure Pf applied to the gasket 105 from the fluid 132. Thus, the material of the gasket 105 should be able to withstand a pressure Pf that is greater than or about 3000 pounds per square inch (PSI). Moreover, the gasket 105 can be made of a material that retains its sealing properties at fluid flow pressures Pf greater than 10,000 PSI. That is, the gasket 105 does not crack or rupture, which would lead to leaks, even when the fluid flow pressure Pf exceeds 10,000 PSI. The gasket 105 should be compliant, deformable, and soft enough to compress as the force 124 applied to join the first and second fluid flow components 122, 126 is increased. The gasket 105 is removable from the joint 120 without causing damage the other components (such as the first and second fluid flow components 122, 126) that constitute the joint 120. That is, the gasket 105 is configured to be detachable from the joint 120. For example, in some implementations, the gasket 105 is made of a polyimide-based plastic such as Vespel™.

As shown in FIG. 1, the support component 110 can be a separate and dedicated piece apart from the first and second fluid flow components 122, 126. In other implementations that are discussed below with reference to FIGS. 6A and 7A, the support component 110 can be a part of or integrated with one or more of the fluid flow components.

The support component 110 surrounds the gasket 105 and can provide one or more functions as follows. First, the support component 110 provides radial support, which means that it acts as a stop along the radial direction (in the X-Y plane) for the gasket 105. As pressure Pf is applied to the gasket 105, the gasket 105 can deform and begin to extrude away from the inner opening 106; the support component 110 stops the gasket 105 from extruding away from the inner opening 106 and therefore reduces the failure rate of the gasket 105. Second, the support component 110 provides an axial stop, which limits the axial compression applied to the gasket 105 due to the tightening of the joint 120 by increasing the force 124 to the first and second fluid flow components 122, 126. At some point during compression, the first and second fluid flow components 122, 126 are prevented from moving toward each other by the hard stop provided by the support component 110.

Because it provides these support functions, the support component 110 is made of a material that is stiffer than the material of the gasket 105. In particular, the support component 110 can be made of a material having a stiffness that is 5-100 times greater than the stiffness of the material of the gasket 105. To put it another way, the material of the support component 110 is much less elastic than the material of the gasket 105. Thus, when subjected to the same amount of stress, the gasket 105 would deform 5-100 times as much as the support component 110. Additionally, due to the proximity of the support component 110 to the first and second fluid components 122, 126, the support component 110 can have a coefficient of thermal expansion that is compatible with the coefficient of thermal expansion of the materials used in the first and second fluid flow components 122, 126. For example, any mismatch in the coefficient of thermal expansion between the support component 110 and the first and second fluid flow components 122, 126 can be equal to the difference in the coefficients of thermal expansion divided by the total axial length of the portion of the support component 110 positioned between the first and second fluid components 122, 126.

The support component 110 can be sized to align the gasket 105 with the first and second fluid flow components 122, 126, centering the complex geometry of the gasket 105 to ensure proper sealing at the joint 120. The support component 110 also includes features to hold the gasket 105 and a fitting (such as second annular ring portion 213 of FIG. 2B) to make assembly in any orientation easy.

If the gasket 105 is made of a polyimide-based plastic, then the support component 110 can be made of an alloy of one or more of: nickel, cobalt, iron, titanium, aluminum, magnesium, copper, molybdenum, and tungsten. In some implementations, the support component 110 is made of a nickel-cobalt ferrous alloy such as Kovar.

The first and second fluid flow components 122, 126 include respective interior passageways 122p, 126p for the fluid 132 to pass. These interior passageways 122p, 126p define the axial flow path 130. One or more of the interior passageways is a pass-through passageway that is able to receive or transmit the fluid 132 to another device other than the fluid flow components 122, 126 and the coupling apparatus 100. As shown in FIG. 1, the first fluid flow passageway 122p is a pass-through since the passageway 122p extends from the inner opening 106 of the gasket 105 all the way through the first fluid flow component 122. Moreover, in the implementation of FIG. 1, the second fluid flow passageway 126p is blind, which means it opens at one end (at the inner opening 106 of the gasket 105) but does not break through to the other side of the second fluid flow component 126. In this way, the second fluid flow component 126 is considered a fluid stop device because it prevents the fluid 132 from passing.

In some implementations, both the first and second fluid flow components 122, 126 have respective interior passageways 122p, 126p that are pass-throughs. An example of such an arrangement is discussed next with reference to FIGS. 2A and 2B.

Figure 2B:
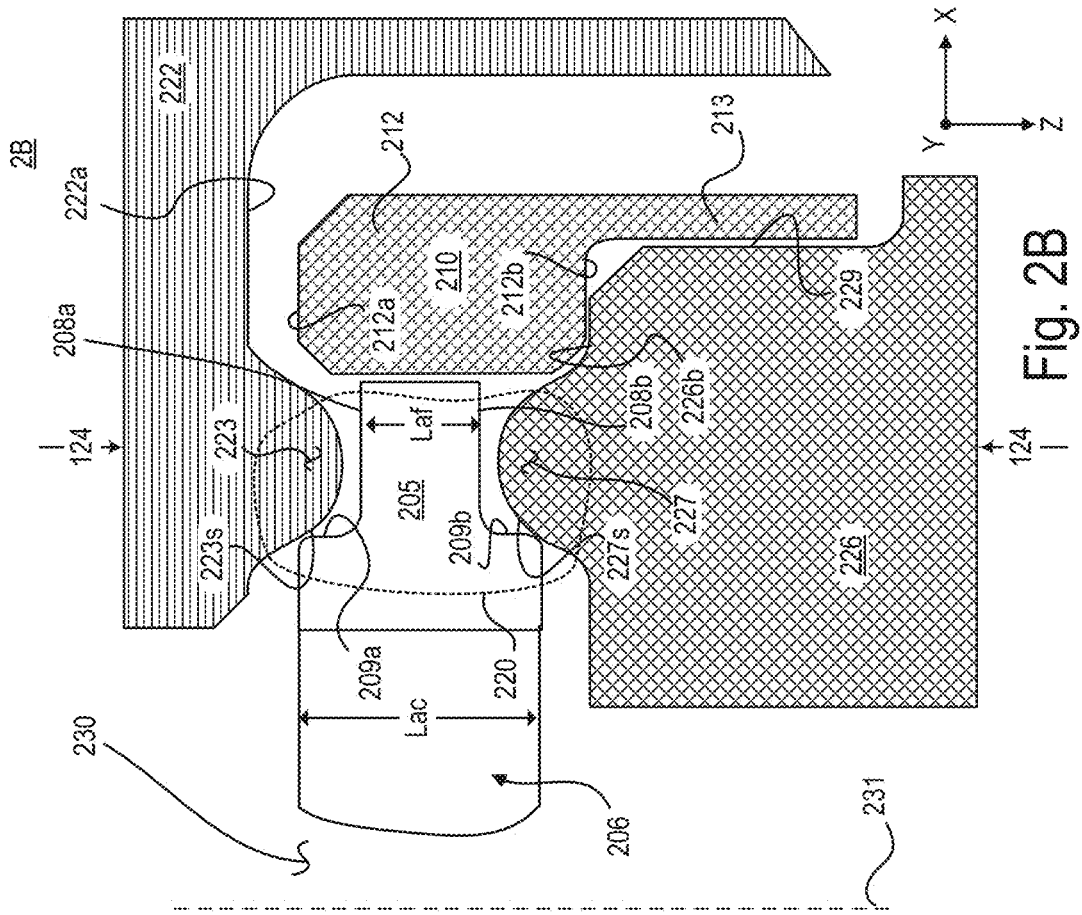
FIG. 2B is a close up cross-sectional view of the interfaces at the coupling apparatus of FIG. 2A.
Figure 2A:
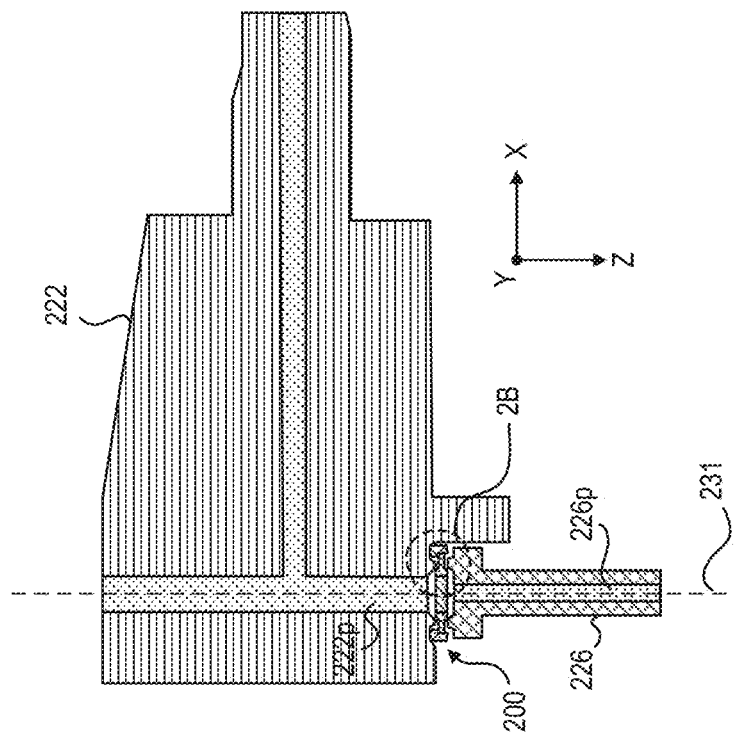
FIG. 2A is a schematic cross-sectional view of an implementation of the coupling apparatus of FIG. 1 placed between a first fluid flow component and a second fluid flow component that form a joint.

In FIGS. 2A and 2B, an implementation 200 of the coupling apparatus 100 is shown. The coupling apparatus 200 is placed between a first fluid flow component 222 and a second fluid flow component 226 that form a joint 220. Both the first fluid flow components 222 and the second fluid flow component 226 include passageways 222p, 226p that are through openings. The first fluid flow component 222 is T-shaped and the passageway 222p is a T-shaped passageway.

The first fluid flow component 222 includes a first annular protrusion or gland 223 that extends axially toward the second fluid flow component 226 when the joint 220 is formed and the second fluid flow component 226 includes a second annular protrusion or gland 227 that extends axially toward the first fluid flow component 222 when the joint 220 is formed. These glands 223, 227 define respective inner radial mating surfaces 223s, 227s that face the axial flow path 230.

Figure 3A:
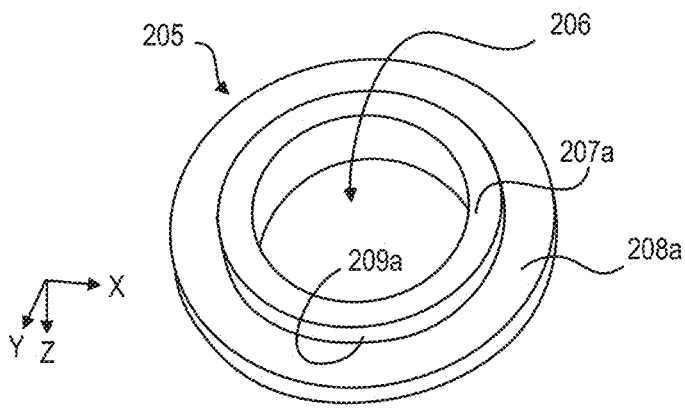
FIG. 3A is a perspective view of an implementation of a gasket in the coupling apparatus of FIG. 2A.
Figure 3B:
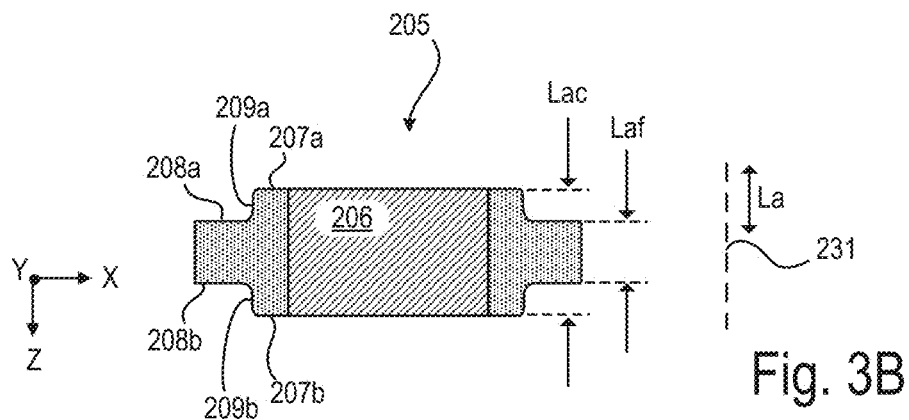
FIG. 3B is a side cross-sectional view of the gasket of FIG. 3A.
Figure 3C:
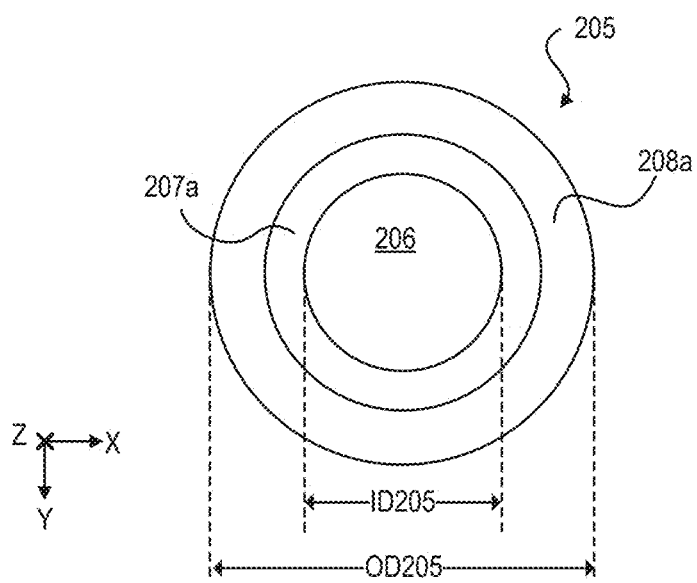
FIG. 3C is a top view of the gasket of FIG. 3A.

Referring also to FIGS. 3A-3C, the coupling apparatus 200 includes a gasket 205 having an inner opening 206 that is fluidly coupled with the passageways 222p, 226p when seated in the joint 220. The inner opening 206 has a diameter ID205 that is large enough to enable the fluid 132 to pass through the gasket 205 when the gasket 205 is seated in the joint 220. The gasket 205 has a shape that has a varying axial extent La, where La is the length of the gasket 205 taken along the axial direction 231 of the fluid flow at the coupling apparatus 200. Specifically, the axial extent Lac that is closest to axial flow path 230 (and inner opening 206) is greater than the axial extent Laf that is farthest from the axial flow path 230 (when the gasket 205 is seated in the joint 220). The gasket 205 has a T shaped cross section taken along the X-Z plane.

In some implementations, and in order to make assembly easier and more error proof, the gasket 205 is axially symmetric, which means that it is symmetric about an axial plane (in the X-Y plane) that cuts through the center of the gasket 205. In some implementations, such as shown in FIGS. 3A-3C, the gasket 205 can further be axisymmetric, that is, rotationally symmetric about the axial direction 231. While in other implementations, the gasket 205 may not be axisymmetric and therefore its cross-sectional shape could be other than circular (such as polygonal, oval, or elliptical, etc.).

The gasket 205 has a pair of opposite facing inner annular planar surfaces 207a, 207b, and a pair of opposite facing outer planar surfaces 208a, 208b that are each connected by a cylindrical intermediate surface 209a, 209b (each of which can be considered an outer radial mating surface).

Figure 4A:
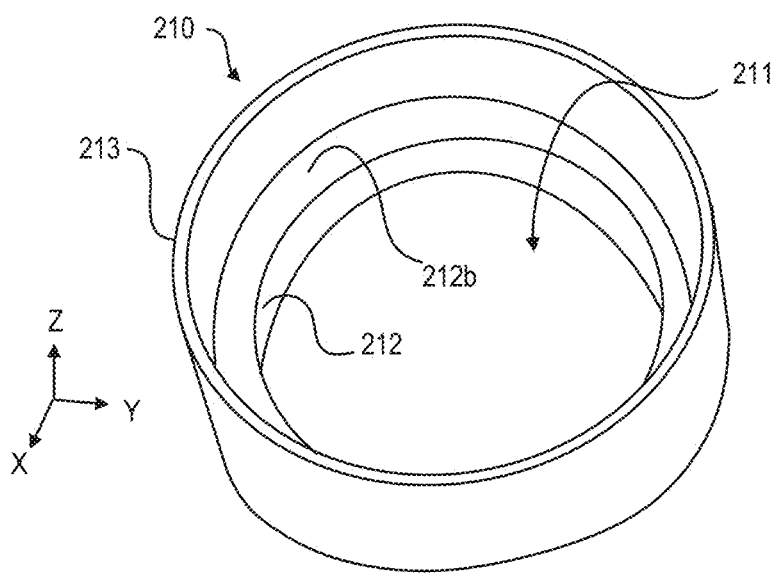
FIG. 4A is a perspective view of an implementation of a support component of the coupling apparatus of FIG. 2A.
Figure 4B:
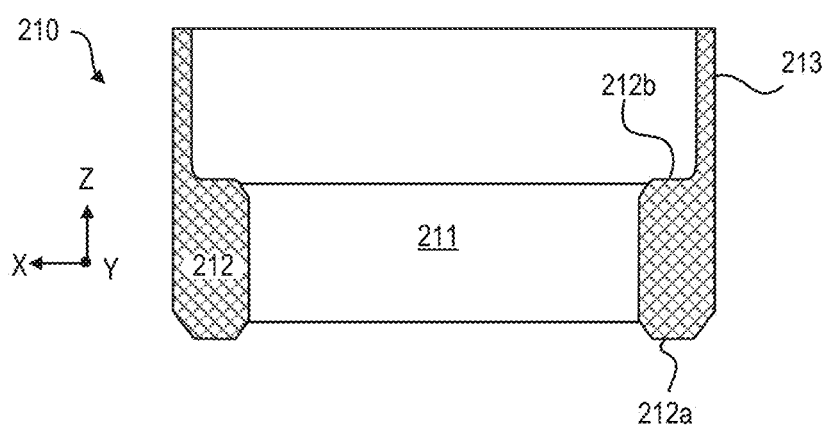
FIG. 4B is a side cross-sectional view of the support component of FIG. 4A.
Figure 4C:
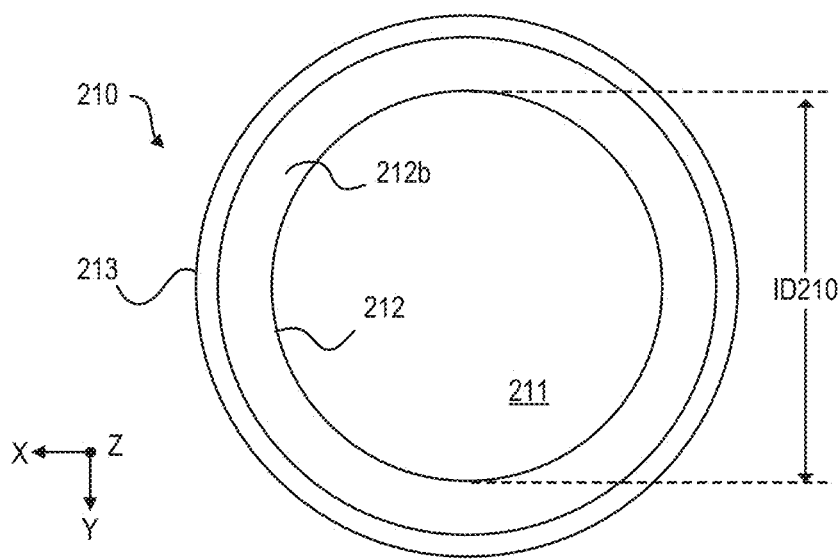
FIG. 4C is a top view of the support component of FIG. 4A.

Referring also to FIGS. 4A-4C, the coupling apparatus 200 includes a support component 210 having an inner opening 211 defined by a first annular ring portion 212, the inner opening 211 being large enough to accommodate the gasket 205 when the coupling apparatus 200 is arranged in the joint 220. Specifically, the inner opening 211 has a diameter ID210 (taken along the radial X-Y plane) that is larger than an outer diameter OD205 of the gasket 205. The support component 210 also includes a second annular ring portion 213 that is seated around a cylindrical surface 229 of the second fluid flow component 226 (as shown in FIG. 2B).

When the coupling apparatus 200 is inserted into the joint 220, several interfaces are formed, at various surfaces and along different directions. Moreover, these interfaces can be engaged at distinct moments in time, depending on how much force 124 is applied. The force 124 can be applied to the first and second fluid components 222, 226 using any suitable mechanical device that is demountable or detachable, and can be removed and enable the first and second fluid components 222, 226 to be unattached. As an example, the force 124 can be applied using one or more clamps or one or more threaded fasteners.

Figure 5C:
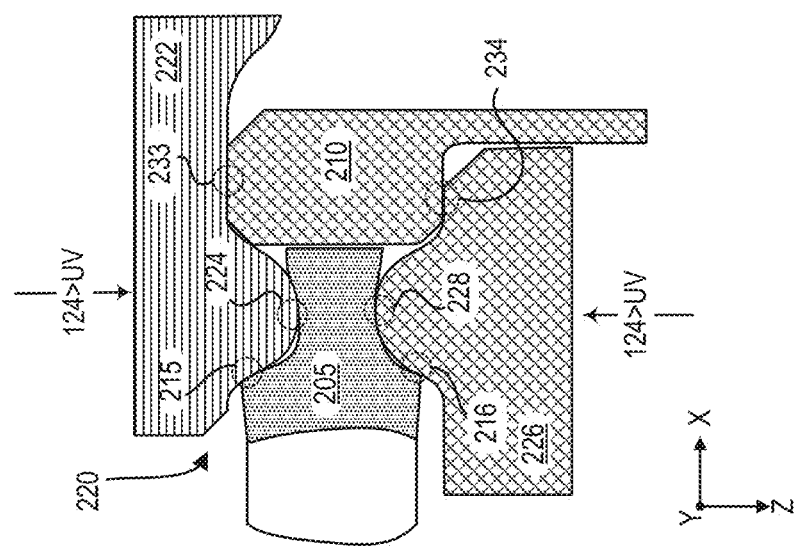
FIG. 5C is a close up cross-sectional view of the interfaces at the coupling apparatus of FIG. 2A, after the joint is initially established, after the coupling apparatus is seated between the first and second fluid flow components, after the pressure-energized interfaces are engaged, after the axial interfaces are engaged, and after the force applied to the opposing first and second fluid flow components exceeds an upper value UV, and a stop interface is engaged.
Figure 5B:
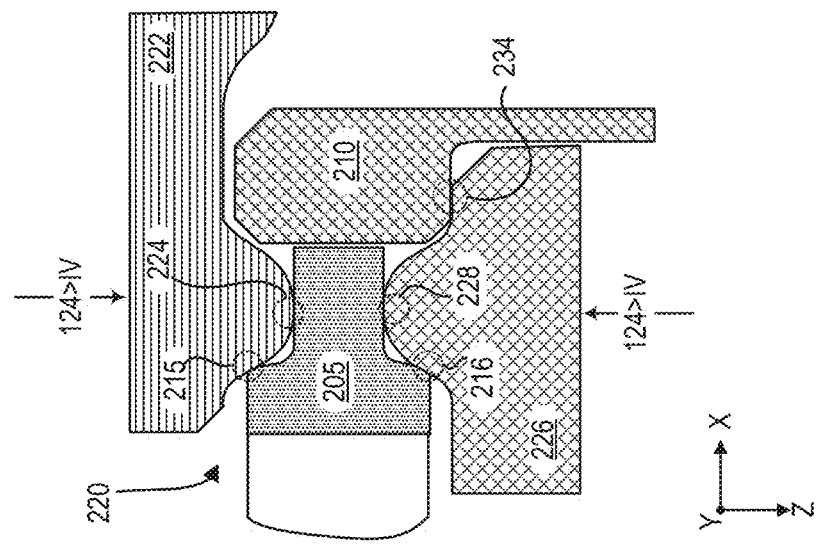
FIG. 5B is a close up cross-sectional view of the interfaces at the coupling apparatus of FIG. 2A, after the joint is initially established, after the coupling apparatus is seated between the first and second fluid flow components, after the pressure-energized interfaces are engaged, and after the force applied to the opposing first and second fluid flow components exceeds an intermediate value IV, and respective axial interfaces are engaged at regions between outer planar surfaces of the gasket and respective glands of the first and second fluid flow components.
Figure 5A:
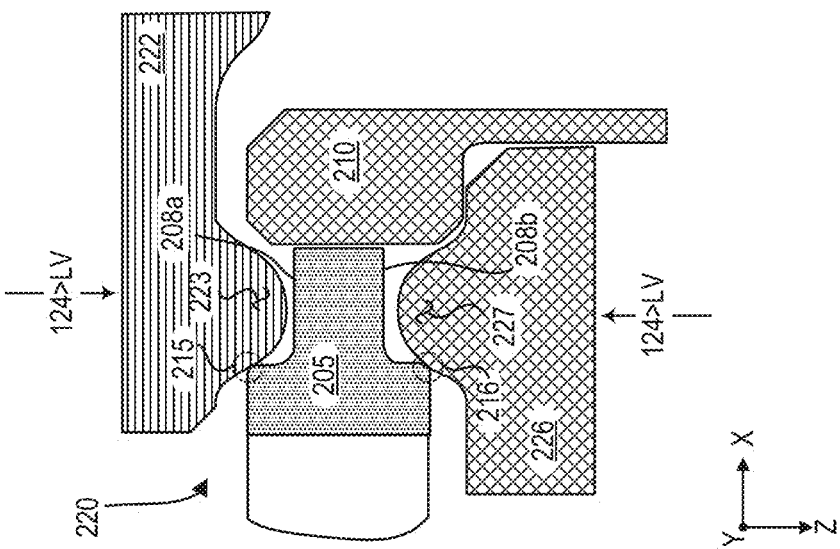
FIG. 5A is a close up cross-sectional view of the interfaces at the coupling apparatus of FIG. 2A, in which the joint is initially established, after the coupling apparatus is seated between the first and second fluid flow components, and pressure-energized interfaces are engaged once a force applied to the opposing first and second fluid flow components exceeds a lower value LV.

With reference to FIG. 5A, when the joint 220 is initially established, after the coupling apparatus 200 is seated between the first and second fluid flow components 222, 226, pressure-energized interfaces 215, 216 are engaged once the force 124 being applied to the opposing first and second fluid flow components 222, 226 exceeds a lower value LV. These pressure-energized interfaces 215, 216 are engaged by the interaction of the cylindrical intermediate surfaces 209a, 209b with the inner radial mating surfaces 223s, 227s of the adjacent respective glands 223, 227. At this time, the opposite facing outer planar surfaces 208a, 208b of the gasket 205 are arranged or positioned between the glands 223 and 227 with the outer planar surface 208a facing the gland 222 and the outer planar surface 208b facing the gland 227. Nevertheless, respective gaps remain present between the outer planar surface 208a and the gland 223 and the outer planar surface 208b and the gland 227 because the force 124 has not yet exceeded an intermediate value IV.

Referring to FIG. 5B, as the force 124 is increased and it exceeds the intermediate value IV, the axial distance between the surface 208a and the gland 223, and the axial distance between the surface 208b and the gland 227 is reduced. Eventually, respective axial interfaces 224, 228 are engaged at the regions between the outer planar surfaces 208a, 208b and respective glands 223, 227 when the outer planar surface 208a begins to touch the gland 223 and the outer planar surface 208b begins to touch the gland 227.

As the force 124 is further increased beyond an upper value UV, the axial distance between a planar surface 212a of the first annular ring portion 212 and an axial wall 222a of the first fluid flow component 222 is reduced until eventually, a stop interface 233 is engaged, as shown in FIG. 5C. Moreover, the axial distance between a second planar surface 212b of the first annular ring portion 212 and an axial wall 226b of the second fluid flow component 226 can be engaged at this time or prior to this time. The end result is that these interaction between the first annular ring portion 212 and the first and second fluid flow components 222, 226 acts as a stop to prevent further or excessive compression on the gasket 205 at the interfaces 215, 216, 224, and 228. At this point, the gasket 205 has been indented at the opposite facing outer planar surfaces 208a, 208b between the glands 223, 227 by a maximum amount permitted by the support component 210, and specifically due to the stop interface 233 being engaged. The amount of indentation of the gasket 205 at the opposite facing outer planar surfaces 208a, 208b that is permitted is determined by the axial extent of the annular ring portion 212 of the support component 210. In some implementations, the gasket 205 can be permitted to compress at the opposite facing outer planar surfaces 208a, 208b by an amount as great as 25%. The maximum amount of compression at the opposite facing outer planar surfaces 208a, 208b of the gasket 205 can be determined with the goal to avoid a strain limit placed on the gasket 205.

In this way, as the joint 220 between the first and second fluid flow components 222, 226 is tightened, the joint seal is initially formed, as shown in FIG. 5A, between an inner radial mating surface 223s, 227s of the gland 223, 228 facing toward the axial flow path 230 of at least one of the fluid flow components (respectively 222 or 226) and an outer radial mating surface of the gasket 205 (surface 209a and/or 209b) prior to the joint seal being formed along the axial direction between the fluid flow components 222, 226 and the gasket 205, as shown in FIG. 5B.

Figure 6A:
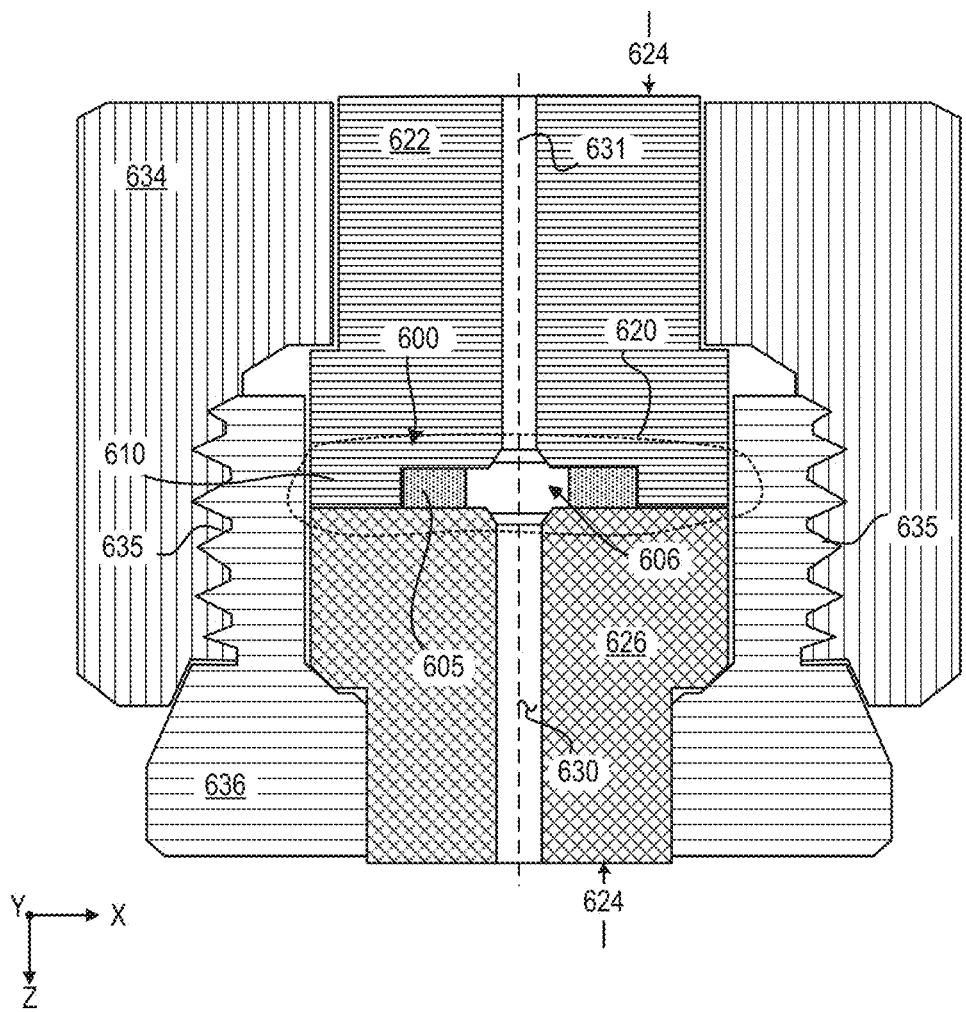
FIG. 6A is a side cross-sectional view of an implementation of the coupling apparatus of FIG. 1 configured to seal a joint between first and second fluid flow components.
Figure 6B:
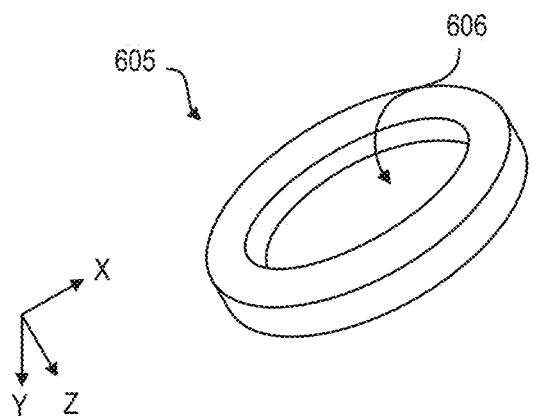
FIG. 6B is a perspective view of a gasket in the coupling apparatus of FIG. 6A.

Referring to FIG. 6A, another implementation 600 of the coupling apparatus 100 is configured to seal a joint 620 between first and second fluid flow components 622, 626 that define an axial flow path 630 extending along an axial direction 631 that is parallel with a Z axis of an X, Y, Z Cartesian coordinate system. The coupling apparatus 600 includes a gasket 605 (also shown in FIG. 6B) that defines an inner opening 606 that extends the axial flow path 630 defined by the first and second fluid flow components 622, 626. The coupling apparatus 600 includes a support component 610, which, in this implementation, is an extension of and is a part of the first fluid flow component 622. This is distinguished from the implementation shown in FIGS. 2A and 2B, where the support component 210 is distinct from both first and second fluid flow components 222, 226. Like the coupling apparatus 100 or 200, the coupling apparatus 600 provides a passive pressure energized seal. Specifically, the gasket 605 is made of a material such as polyimide, and when the pressure Pf is applied to the gasket 605 from any fluid (such as fluid 132) traversing the inner opening 606 improves the hermetic function of the seal at the joint 620. In other words, as the pressure Pf increases, the seal at the joint 620 becomes better able to prevent the passage of fluid through the joint 620.

As also shown in FIG. 6A, the first and second fluid flow components 622, 626 are joined together using clamping devices 634, 636, that are configured to mate with each other. The joint 620 is tightened by tightening a joint 635 at the interface of the clamping device 634, 636 such that the force 624 is applied to the first and second fluid flow components 622, 626 due to the tightening at the joint 635.

As discussed above, during operation when fluid flows through the axial flow path 630 and through the inner opening 606, the gasket 605 is prevented from extruding from the inner opening 606 and losing its sealing ability by the radial stop provided by the support component 610.

Figure 7A:
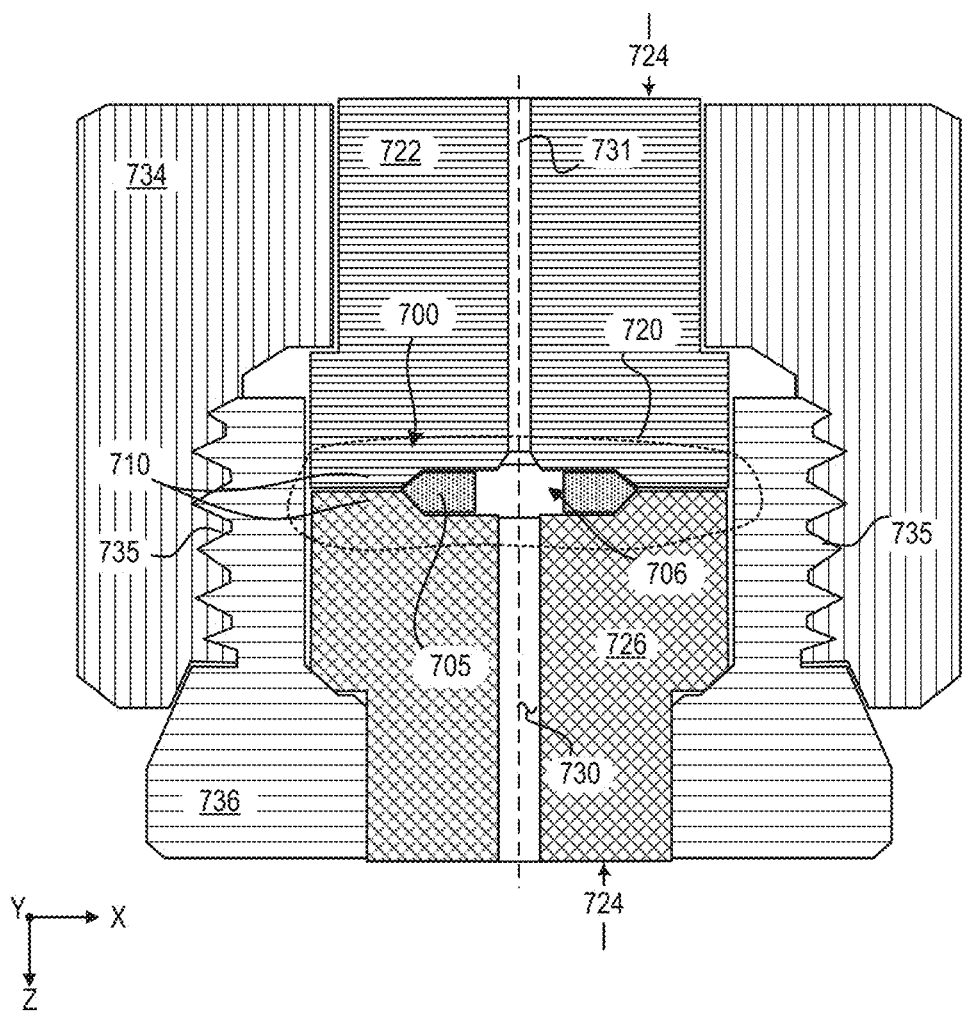
FIG. 7A is a side cross-sectional view of an implementation of the coupling apparatus of FIG. 1 configured to seal a joint between first and second fluid flow components.
Figure 7B:
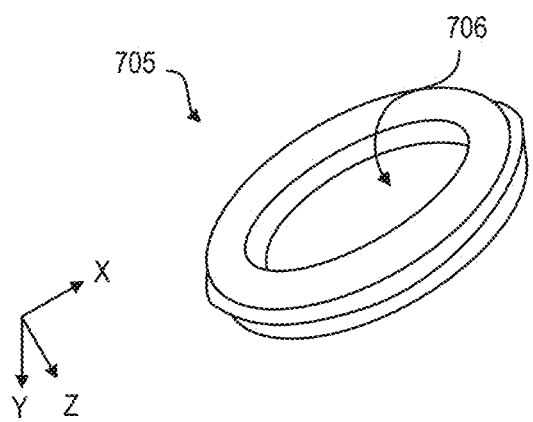
FIG. 7B is a perspective view of a gasket in the coupling apparatus of FIG. 7A.

Referring to FIG. 7A, another implementation 700 of the coupling apparatus 100 is configured to seal a joint 720 between first and second fluid flow components 722, 726 that define an axial flow path 730 extending along an axial direction 731 that is parallel with a Z axis of an X, Y, Z Cartesian coordinate system. The coupling apparatus 700 includes a gasket 705 (also shown in FIG. 7B) that defines an inner opening 706 that is fluidly coupled to and extends the axial flow path 730 defined by the first and second fluid flow components 722, 726. The coupling apparatus 700 includes a support component 710, which in this implementations, is an extension of and is a part of both the first fluid flow component 722 and the second fluid flow component 726. This is distinguished from the implementation shown in FIGS. 2A and 2B, where the support component 210 is distinct from both first and second fluid flow components 222, 226, and the implementation shown in FIG. 6A, where the support component 710 is an extension of and a part of just the first fluid flow component 622. Like the coupling apparatus 100, 200, and 600, the coupling apparatus 700 provides a passive pressure energized seal. Specifically, the gasket 705 is made of a material such as polyimide, and when the pressure Pf (FIG. 1) is applied to the gasket 705 from any fluid (such as fluid 132) traversing the inner opening 706 improves the hermetic function of the seal at the joint 720. In other words, as the pressure Pf increases, the seal at the joint 720 becomes better able to prevent the passage of fluid through the joint 720.

As also shown in FIG. 7A, the first and second fluid flow components 722, 726 are joined together using clamping devices 734, 736, that are configured to mate with each other. The joint 720 is tightened by tightening a joint 735 at the interface of the clamping device 734, 736 such that the force 724 is applied to the first and second fluid flow components 722, 726 due to the tightening at the joint 735.

As discussed above, during operation when fluid flows through the axial flow path 730 and through the inner opening 706, the gasket 705 is prevented from extruding from the inner opening 706 and losing its sealing ability by the radial stop provided by the support component 710.

Figure 8:
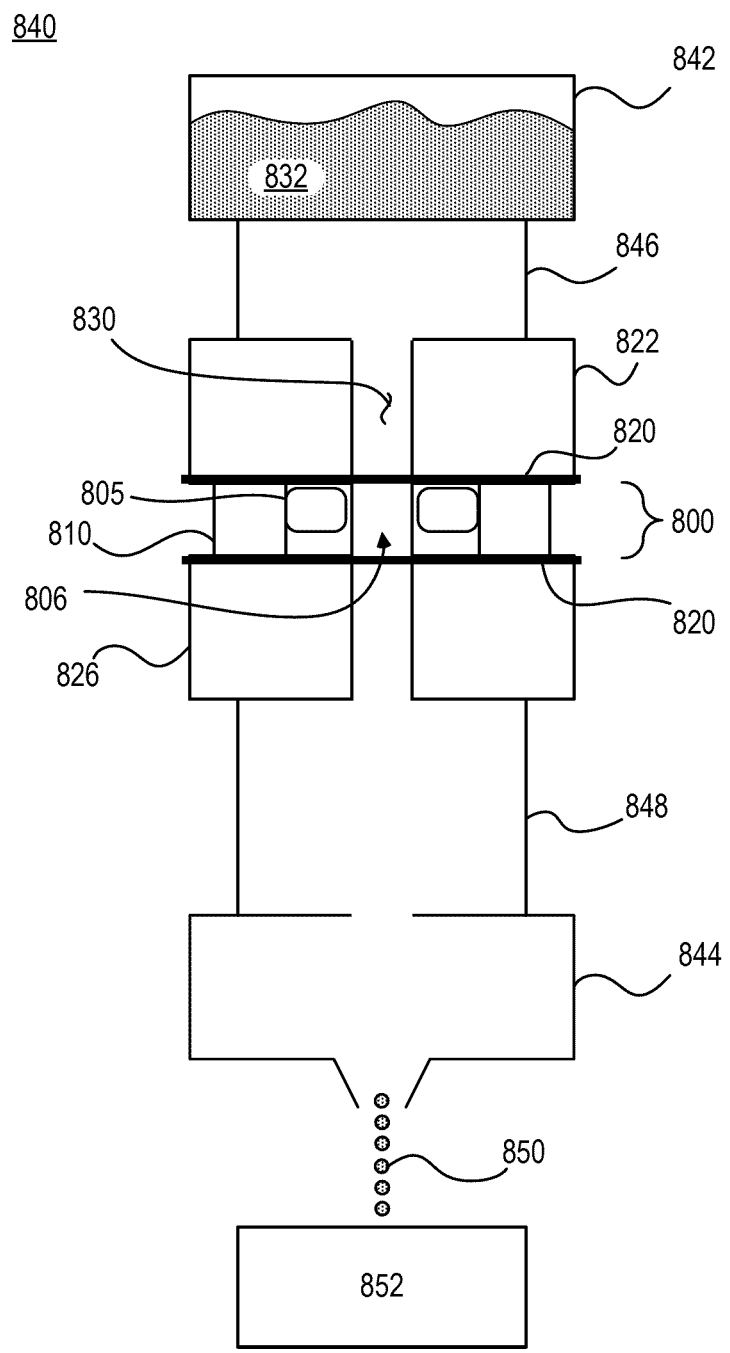
FIG. 8 is a schematic diagram of a target material supply apparatus in which an implementation of a coupling apparatus is configured to seal a joint between first and second fluid flow components defining an axial flow path between a source of target material fluid and a nozzle supply apparatus.

Referring to FIG. 8, a coupling apparatus 800 is configured to seal the joint 820 between first and second fluid flow components 822, 826 that are a part of a target material supply apparatus 840. The first and second fluid flow components 822, 826 define an axial flow path 830 when joined together. The axial flow path 830 is a fluid flow path between a source 842 of target material fluid 832 and a nozzle supply apparatus 844. The axial flow path 830 is configured to pass the target material fluid 832 toward the nozzle supply apparatus 844. The coupling apparatus 800 includes a gasket 805 that is made of a material other than metal or metal alloys. The gasket 805 is compatible with and inert to the target material fluid 832.

The gasket 805 can have an annular shape defining an inner opening 806 that is a part of and extends the axial flow path 830 when seated and sealed within the joint 820. Additionally, when the gasket 805 is seated between the first and second fluid flow components 822, 826 to thereby seal the joint 820 formed by attaching the first and second fluid flow components 822, 826, pressure Pf applied to the gasket 805 from the target material fluid 832 traversing the gasket inner opening 806 along the axial flow path 830 improves the hermetic function of the seal at the joint 820.

The target material supply apparatus 840 can include a fluid flow system 846 positioned between the target material fluid source 842 and the first fluid flow component 822 in order to transfer the target material fluid 832 from the source 842 to the first fluid flow component 822. The fluid flow system 846 includes one or more fluid flow components. Additionally, the target material supply apparatus 840 can include a fluid flow system 848 positioned between the second fluid flow component 826 and the nozzle supply apparatus 844 in order to transfer the target material fluid 832 from the second fluid flow component 826 to the nozzle supply apparatus 844. The fluid flow system 848 includes one or more fluid flow components.

The target material fluid source 842 can include one or more reservoir systems, a priming system that is configured to prepare the target material fluid 832 from a solid matter, one or more fluid regulation devices, and a fluid control system for controlling aspects of the source 842 in order to produce and supply the target material fluid 832.

The nozzle supply apparatus 844 is configured to receive the target material fluid 832 from the second fluid flow component 826 via the optional fluid flow component set 848, and to supply the target material fluid 832 in the form of the stream of targets 850 to an external system 852. Moreover, the target material supply apparatus 840 can be configured to supply the nozzle supply apparatus 844 with the target material fluid 832 during continuous operation of the nozzle supply apparatus 844 (that is, while the nozzle supply apparatus 844 is supplying the target material fluid 832 to the external system 852).

Figure 9:
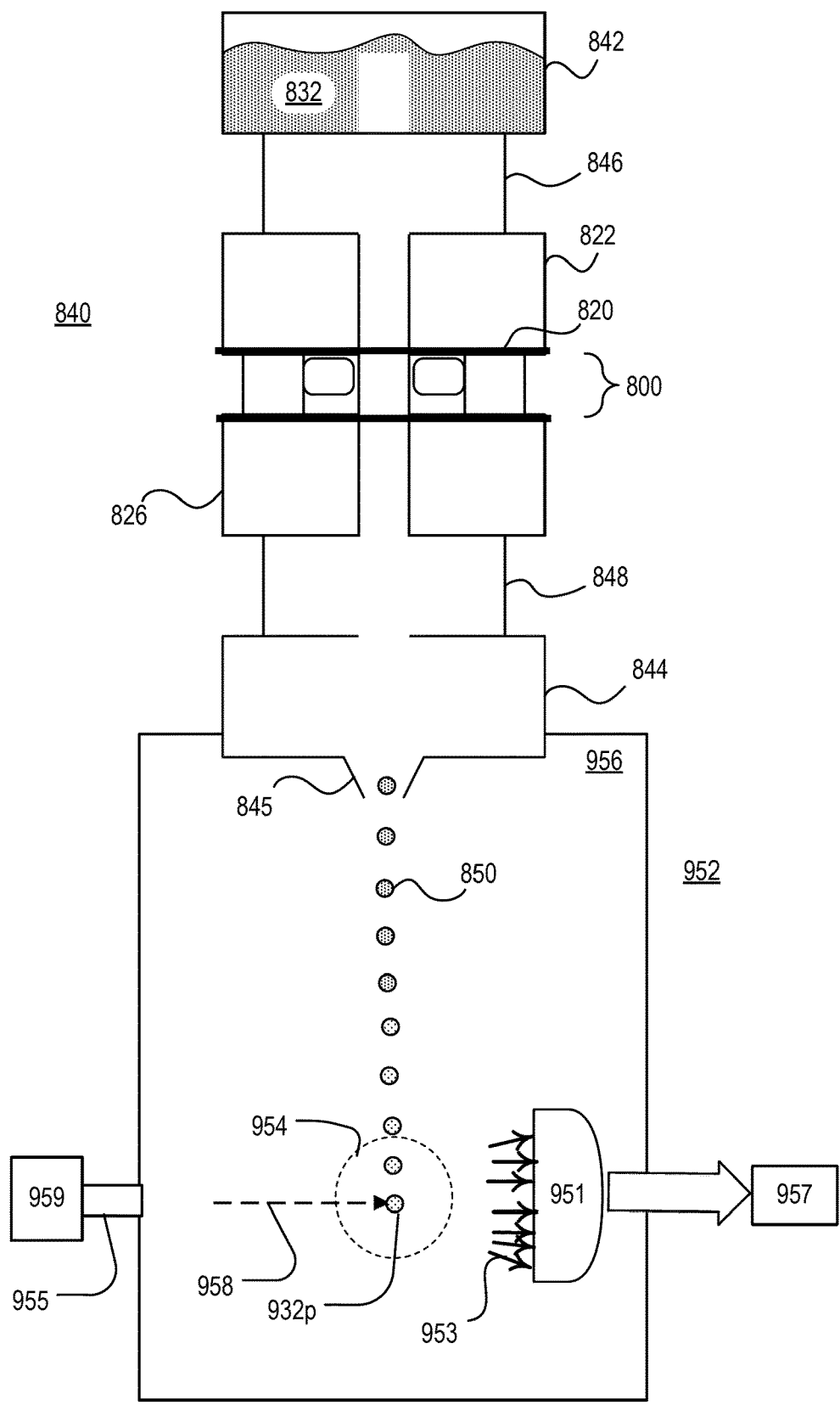
FIG. 9 is a schematic diagram of the target material supply apparatus of FIG. 8, in which the nozzle supply apparatus provides a stream of targets (made from the target material fluid) to an EUV light source.

For example, in the implementation shown in FIG. 9, the external system 852 is an EUV light source 952, and the nozzle supply apparatus 844 can emit the stream of targets 850 made from the target material fluid 832 such that a target 932$p$ is delivered to a plasma formation location 954 in a vacuum chamber 956. Each target 850 can be provided to the plasma formation location 954 by passing molten target material fluid 832 through a nozzle assembly 845 of the nozzle supply apparatus 844, and allowing the target 850 to drift along a trajectory to the plasma formation location 954. In some implementations, the target 850 can be directed to the plasma formation location 954 by force.

The plasma formation location 954 can receive at least one light beam 958 that has been generated by an optical source 959 and delivered to the vacuum chamber 956 by way of an optical path 955. An interaction between the light beam 958 and the target material in the target 932$p$ produces a plasma that emits EUV light 953, which is collected 951 and supplied to a lithography exposure apparatus 957. In this example, the target material fluid 832 can be any material that emits EUV light 953 when in a plasma state. For example, the target material fluid 832 can include water, tin, lithium, xenon, and/or any material that, when converted to a plasma state, has an emission line in the EUV range. For example, the target material can be the element tin, which can be used as pure tin (Sn); as a tin compound, for example, SnBr4, SnBr2, SnH4; as a tin alloy, for example, tin-gallium alloys, tin-indium alloys, tin-indium-gallium alloys, or any combination of these alloys.

The lithography exposure apparatus 957 uses this EUV light 953 to create a pattern on a wafer, using any number of process steps, which can be one or more of a combination of process steps such as etching, deposition, and lithography processes with a different mask to create a pattern of openings (such as grooves, channels, or holes) in the material of the wafer or in materials deposited on the wafer.

The use of the coupling apparatus 800 in the target material supply apparatus 840 leads to an increase in the power output from and the performance of the EUV light source 952, including reduced failures at the target material supply apparatus 840, and a reduction in down time for operating the EUV light source 952. Such improvements are a result of the nozzle supply apparatus 844 providing a continuous and adjustable flow of targets 850. In particular, the pressure applied to the target material fluid 832 within the target material supply apparatus 840 can be adjusted and scaled up because the coupling apparatus 800 is less likely to fail at higher fluid pressures Pf because the coupling apparatus 800 is more robust than prior devices for sealing the joint 820.

Figure 10:
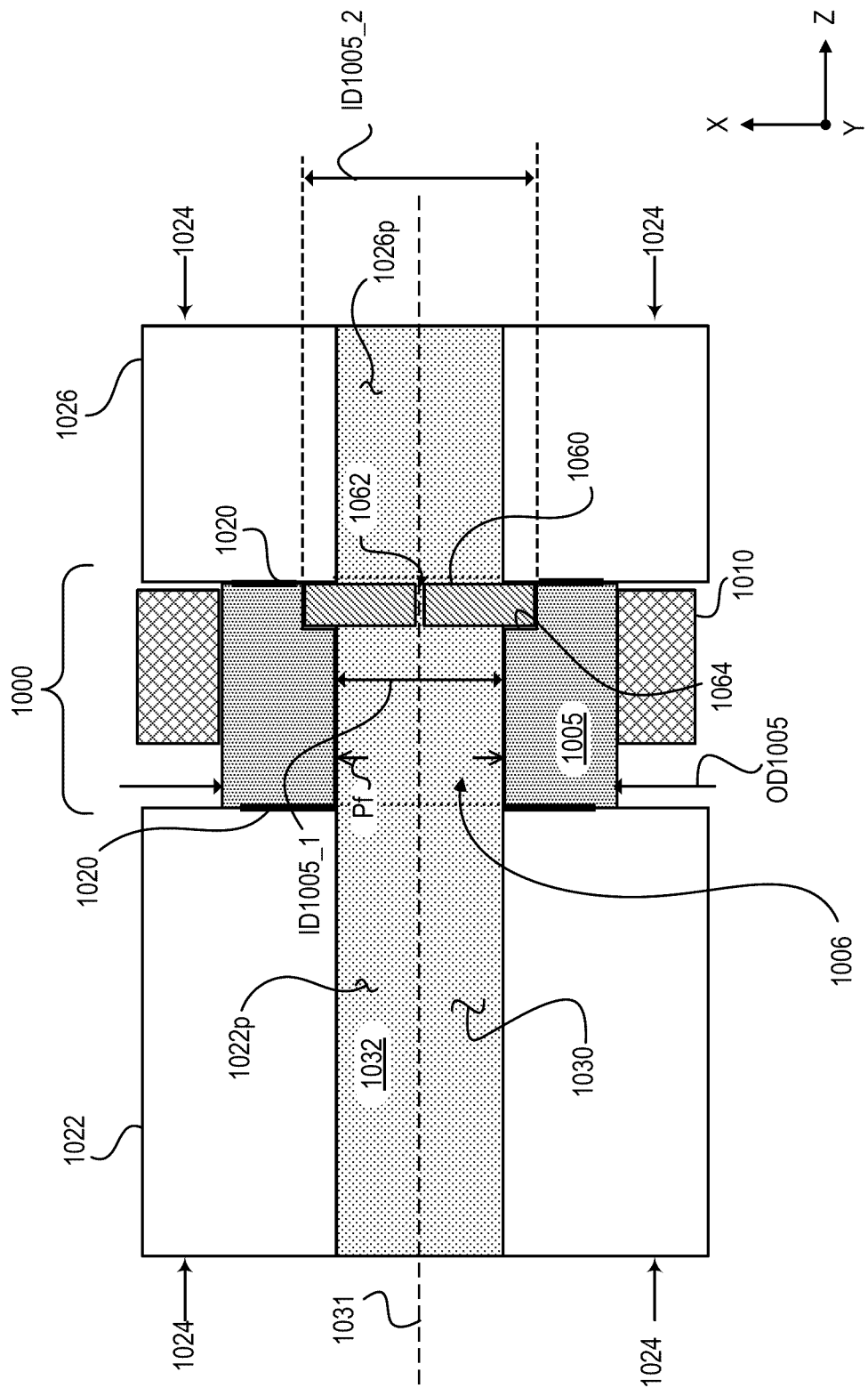
FIG. 10 is a block diagram of an implementation of the coupling apparatus of FIG. 1 that includes an insert (which can be a flow restrictor and/or a separating insert) seated within a gasket.

Referring to FIG. 10, an implementation 1000 of the coupling apparatus 100 is configured to provide additional (for example, flow restricting and/or separability) functionality to the joint 1020. To this end, the coupling apparatus 1000 includes an implementation 1005 of the gasket 105 that is configured to receive and seat a functional insert 1060, which may function as a flow restrictor or a separating insert, for example. The joint 1020 is formed by attaching first and second fluid flow components 1022, 1026 upon application of a force 1024 applied along an axial direction 1031, which is parallel with a Z axis of an X, Y, Z Cartesian coordinate system. As with the joint 120, the joint 1020 can be a demountable connection, which means that it is made up of components that are detachable from each other. Similar to the force 124, any suitable mechanical device or devices can be used to provide the force 1024. Similarly, the force 1024 applied by the mechanical device can be removed without damaging the joint 1020. For example, the force 1024 can be applied using threaded fasteners, pins, retaining rings, or clamps.

The first and second fluid flow components 1022, 1026 define an axial flow path 1030 through which a fluid 1032 can traverse. The axial flow path 1030 extends along the axial direction 1031. The coupling apparatus 1000 is robust and the functionality of the coupling apparatus 1000 improves as a pressure of the fluid 1032 that traverses the axial flow path 1030 increases. The coupling apparatus 1000 is a passive device, which means that no additional energy is required for the coupling apparatus 1000 to operate as a sealing mechanism. In this way, the coupling apparatus 1000 provides a passive pressure energized seal.

The coupling apparatus 1000 includes the gasket 1005, the functional insert 1060, and a support component 1010. An annular shape of the gasket 1005 (like the gasket 105) defines an inner opening 1006, in which a diameter (such as diameters $ID1005\_1$ and $ID1005\_2$ discussed below) of the inner opening 1006 is taken along the radial plane (the X-Y plane), which is perpendicular to the axial direction 1031. The inner opening 1006 extends the axial flow path 1030 of either or both of the first and second fluid flow components 1022, 1026.

The gasket 1005 is arranged in the support component 1010, which is similar in design to the support component 110. As discussed above, the support component 1010 has an annular shape, to match or complement the shape of the gasket 1005. When the gasket 1005 is seated between the first and second fluid flow components 1022, 1026 and the joint 1020 is formed by attaching the first and second fluid flow components 1022, 1026 upon application of the force 1024, pressure Pf that is applied to the gasket 1005 from any fluid 1032 traversing the inner opening 1006 improves the hermetic function of the seal at the joint 1020. Specifically, this means that as the pressure Pf increases, the seal at the joint 1020 becomes better able to prevent the passage of fluid 1032 through the joint. Thus, as the pressure Pf increases, leakage of fluid 1032 through the joint 1020 is reduced. The pressure Pf applied to the gasket 1005 due to the flow of the fluid 1032 through the joint 1020 is distinct from the pressure applied to the gasket 1005 due to the force 1024 applied to the first and second fluid flow components 1022, 1026. In other words, the pressure Pf applied to the gasket 1005 arises from the force of the fluid 1032 through the joint 1020, not the force 1024 applied to the first and second fluid flow components.

Like the gasket 105, the gasket 1005 is robust against defects and process. This means that the material of the gasket 1005 is better able to comply and deform to account for variations in the materials at the joint 1020 and to better seal against such variations (much like a rubber compound).

But, the material of the gasket 1005 has properties that make it more suitable than rubber compounds traditionally used in rubber O-Rings. For example, the material of the gasket 1005 is stronger than a common rubber O-Ring. The material of the gasket 1005 is thermally stable, which means its sealing properties do not change significantly with changes in temperature that occur at the joint 1020, such temperature changes occurring in part due to the temperature at which the fluid 1032 is maintained (to keep the fluid 1032 in a non-solid form). The design and material of the gasket 1005 is such that tightening of the joint 1020 is a more robust process, producing more consistent joints 1020 that are within torque and rotation specifications. The gasket 1005 is able to withstand greater elastic strain, and can accommodate several micrometers of fitting expansion, which can occur when the pressure Pf increases or from external loads such as applied as the force 1024.

The gasket 1005 is made of a material that is compatible with and not reactive with the material of the fluid 1032 that comes in contact with the gasket 1005. Additionally, the material of the gasket 1005 is able to withstand the temperature at which the fluid 1032 needs to be maintained. For example, if the fluid 1032 includes tin, then the gasket 1005 should be made of a material that can withstand operating temperatures of at least 200° C. because tin melts at 232° C. and is maintained at 260° C. to ensure it remains in the form of a liquid. The material of the gasket 1005 should be able to withstand the pressure Pf applied to the gasket 1005 from the fluid 1032. Thus, the material of the gasket 1005 should be able to withstand a pressure Pf that is greater than or about 3000 pounds per square inch (PSI). Moreover, the gasket 1005 can be made of a material that retains its sealing properties at fluid flow pressures Pf greater than 10,000 PSI. That is, the gasket 1005 does not crack or rupture, which would lead to leaks, even when the fluid flow pressure Pf exceeds 10,000 PSI. The gasket 1005 should be compliant, deformable, and soft enough to compress as the force 1024 applied to join the first and second fluid flow components 1022, 1026 is increased.

The gasket 1005 is removable from the joint 1020 without causing damage the other components (such as the first and second fluid flow components 1022, 1026) that constitute the joint 1020. That is, the gasket 1005 is configured to be detachable from the joint 1020. For example, in some implementations, the gasket 1005 is made of a polyimide-based plastic such as Vespel™.

The support component 1010 surrounds the gasket 1005 and can provide one or more of the functions discussed above. Because it provides these support functions, the support component 1010 is made of a material that is stiffer than the material of the gasket 1005. In particular, the support component 1010 can be made of a material having a stiffness that is 5-100 times greater than the stiffness of the material of the gasket 1005. To put it another way, the material of the support component 1010 is much less elastic than the material of the gasket 1005. Thus, when subjected to the same amount of stress, the gasket 1005 would deform 5-100 times as much as the support component 1010. Additionally, due to the proximity of the support component 1010 to the first and second fluid components 1022, 1026, the support component 1010 can have a coefficient of thermal expansion that is compatible with the coefficient of thermal expansion of the materials used in the first and second fluid flow components 1022, 1026. For example, any mismatch in the coefficient of thermal expansion between the support component 1010 and the first and second fluid flow components 1022, 1026 can be equal to the difference in the coefficients of thermal expansion divided by the total axial length of the portion of the support component 1010 positioned between the first and second fluid components 1022, 1026.

If the gasket 1005 is made of a polyimide-based plastic, then the support component 1010 can be made of an alloy of one or more of: nickel, cobalt, iron, titanium, aluminum, magnesium, copper, molybdenum, and tungsten. In some implementations, the support component 1010 is made of a nickel-cobalt ferrous alloy such as Kovar.

The first and second fluid flow components 1022, 1026 include respective interior passageways 1022*p*, 1026*p* for the fluid 1032 to pass. These interior passageways 1022*p*, 1026*p* define the axial flow path 1030.

In some implementations, functional insert 1060 is a flow restrictor and it can be made of a bulk material that defines an inner opening 1062. This bulk material is compatible with the material of the target material fluid 1032 since the flow restrictor 1060 comes into direct contact with the target material fluid 1032. For example, if the target material fluid 1032 includes tin or a tin alloy, then the bulk material of the flow restrictor 1060 can be made of tantalum or a tantalum alloy and machined using conventional machining techniques such as lathes or carbide tools. In other possible implementations, the bulk material of the flow restrictor 1060 is made of tungsten, rhenium, molybdenum, chrome or alloys of these metals. In implementations in which the target material fluid 1132 includes tin or tin compounds, the flow restrictor 1060 can be made of boron carbide, various metals with tin-phobic coatings, other refractory metals, polyimide or other suitable materials. In still other possible implementations, the bulk material of the flow restrictor 1060 is made of ceramic, glass, or silicone.

In other implementations, the flow restrictor 1060 is made of a substrate that is coated with a material that is compatible with the material of the target material fluid 1032.

In other implementations, the functional insert 1060 is a separating insert (such as described with reference to FIG. 16) and it can be made of a material that is compatible with (that is, does not react with) and phobic to (actively repels) the material of the target material fluid 1032. In such implementations in which the target material fluid 1032 includes tin or tin compounds, the separating insert 1060 can be made of glass, ceramic, boron carbide, metals with tin-phobic coatings, refractory metals such as tantalum, or polyimide.

In some implementations, the functional insert 1060 functions as both a flow restrictor and a separating insert. For example, the functional inserts 1060 of FIGS. 11A-15 function as both a flow restrictor and a separating insert because the inner opening 1062 is small enough to provide flow restricting functionality and separating capabilities. The functional insert 1060 has separating capabilities if it facilitates the separation of the first and second fluid flow components 1022, 1026. In this way, the first and second fluid flow components 1022, 1026 can be separated from each other (for example, in order to service a part of the flow path) without causing damage to the flow components 1022, 1026 because of the design of the functional insert 1060. In other implementations, the functional insert 1060 can function as merely a separating insert that has an inner opening 1062 that is small enough to provide separating capabilities, but is not so small as to provide noticeable flow restricting functionality. Such a design is described with reference to FIG. 16 below.

In the coupling apparatus 1000, the inner opening 1006 of the gasket 1005 is stepped or tiered so that it has two distinct inner diameters ID1005_1 and ID1005_2. The smaller diameter ID1005_1 of the inner opening 1006 of the gasket 1005 should be large enough to extend the axial flow path 1030 and the larger diameter ID1005_2 of the inner opening 1006 of the gasket 1005 should be large enough to accommodate the functional insert 1060. Thus, the smaller diameter ID1005_1 of the inner opening 1006 is large enough to enable the fluid 1032 to pass through the gasket 1005 (that is, through the inner opening 1006 of the gasket 1005). The inner opening 1062 of the functional insert 1060 has a diameter (in the XY plane) that is smaller than both of the diameters ID1005_1 and ID1005_2 of the inner opening 1006 of the gasket 1005. Additionally, the smaller diameter ID1005_1 of the inner opening 1006 of the gasket 1005 is at least as large as the diameter of the restricted inner opening 1062, at least as large as the diameter of the interior passageway 1022$p$ of the first fluid flow component 1022, and also small enough to enable axial support for the functional insert 1060 at the XY interface 1064 between the gasket 1005 and the flow restrictor 1060.

Figure 11A:
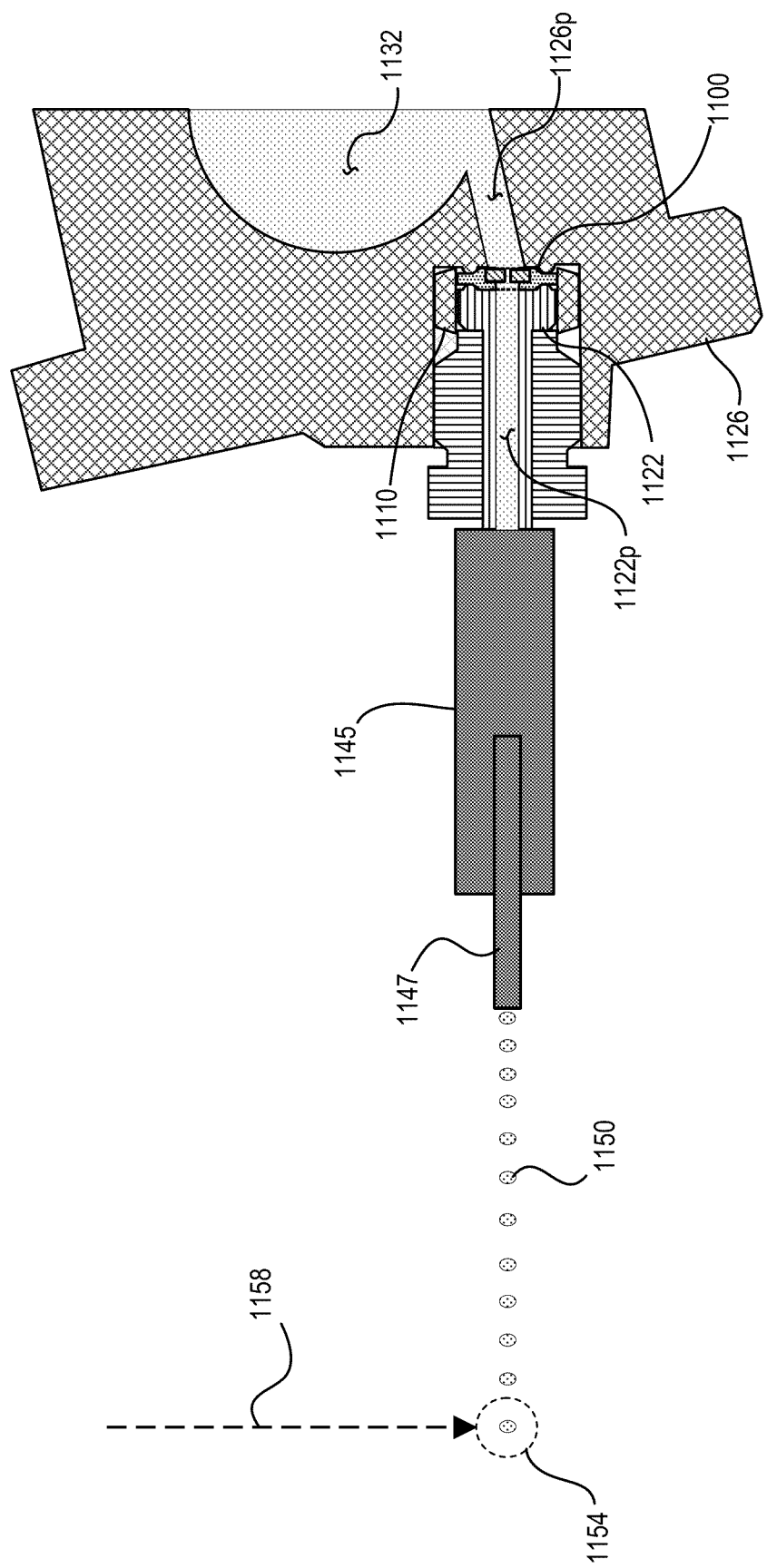
FIG. 11A is a side cross-sectional diagram of an implementation of the flow restricting coupling apparatus of FIG. 10 positioned in a nozzle supply apparatus between a nozzle assembly and a target material fluid reservoir.
Figure 11B:
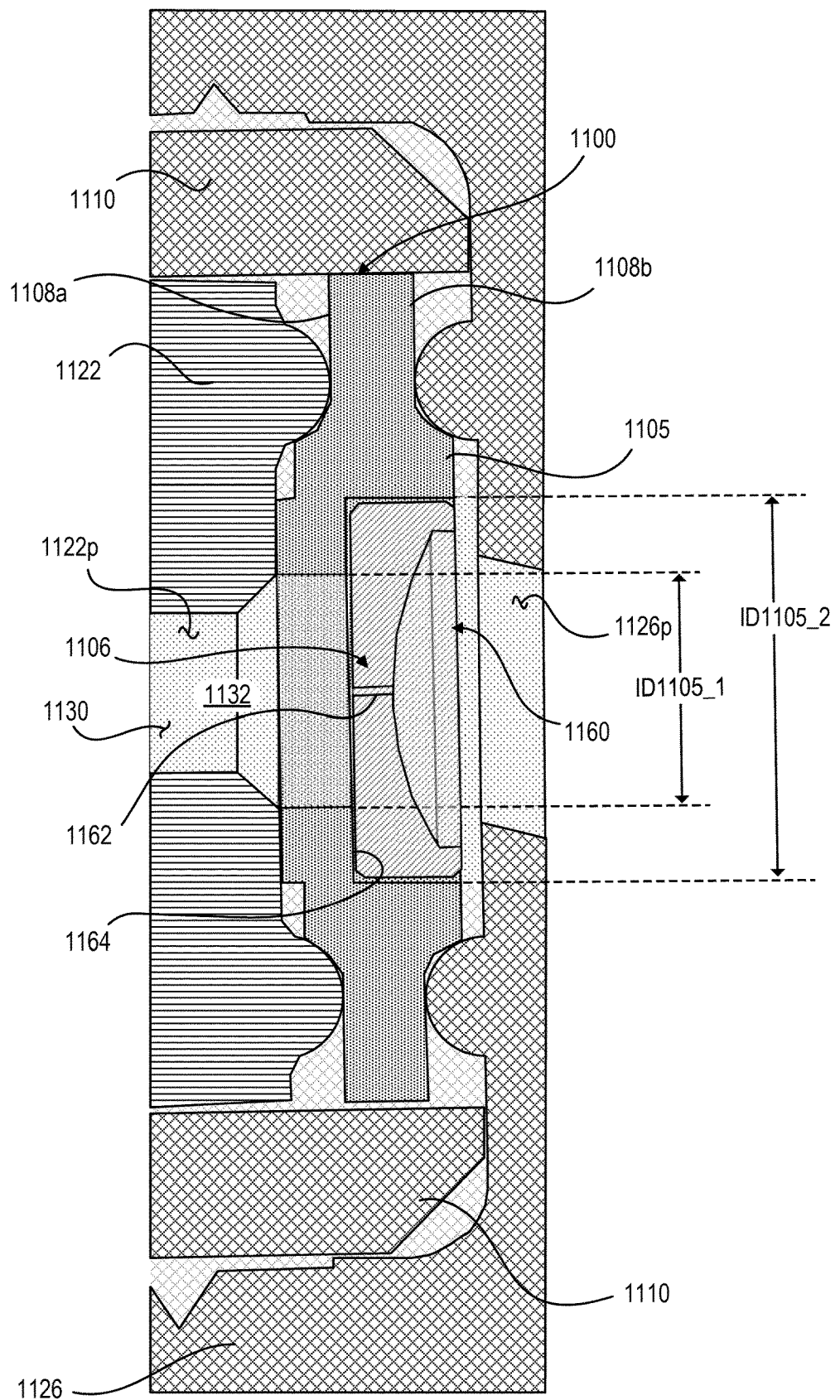
FIG. 11B is a side cross-sectional diagram of a detail of the flow restricting coupling apparatus of FIG. 11A.
Figure 12A:
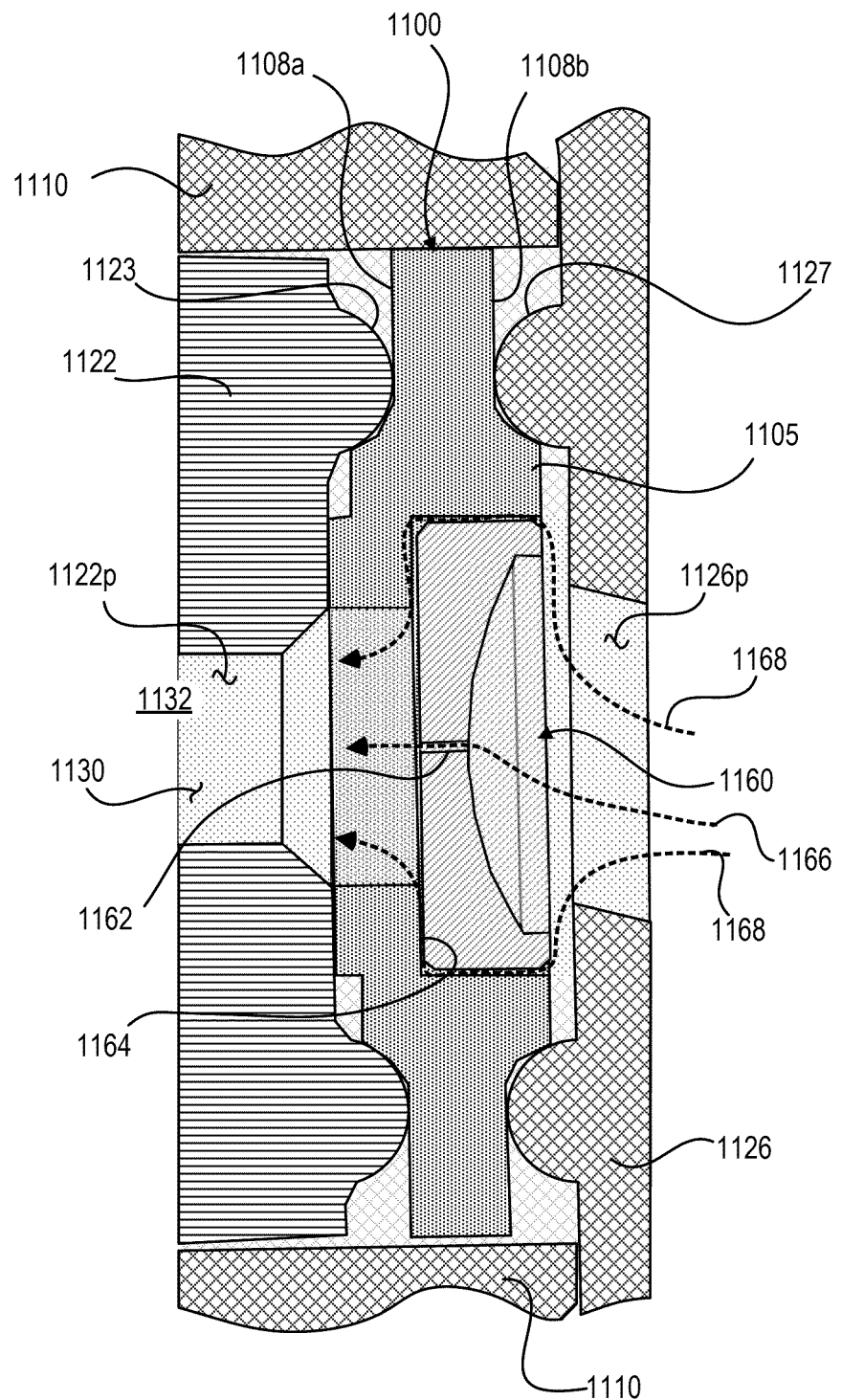
FIG. 12A is a side cross-sectional diagram showing the flow restricting coupling apparatus of FIGS. 11A and 11B during normal operation.
Figure 12B:
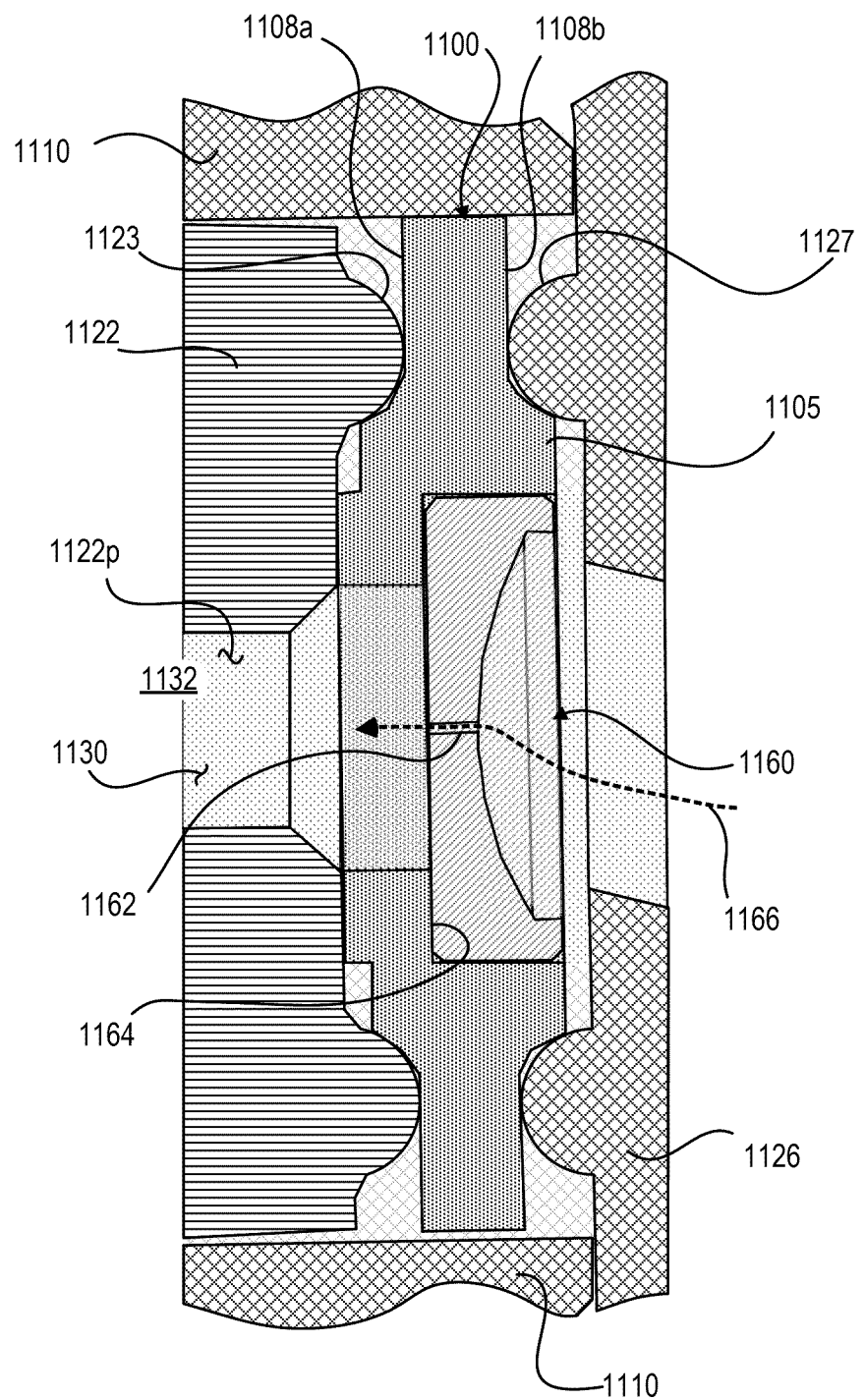
FIG. 12B is a side cross-sectional diagram showing the flow restricting coupling apparatus of FIGS. 11A and 11B during flow restricting operation.

Referring to FIGS. 11A and 11B, an implementation 1100 of the coupling apparatus 1000 is shown in which the functional insert 1060 is primarily a flow restrictor 1160 and also provides separating functionality. The flow restricting coupling apparatus 1100 is positioned in the nozzle supply apparatus 844 (FIGS. 8 and 9) between the nozzle assembly 1145 (which is an implementation of the nozzle assembly 845) and a target material fluid reservoir 1126 (which corresponds to the second fluid flow component 1026) that holds target material fluid 1132. The coupling apparatus 1100 includes the gasket 1105, the flow restrictor 1160, and the support component 1110. The annular shape of the gasket 1105 is compatible with the shape of the flow restrictor 1160 which serves as an insert within gasket 1105. The gasket 1105 (like the gasket 105) defines an inner opening 1106, in which a diameter (such as diameters ID1105_1 and ID1105_2 discussed below) of the inner opening 1106 is taken along the radial plane (the X-Y plane), which is perpendicular to the axial direction 1131 (defined by the direction of flow of the target material fluid 1132.

An adapter 1122 (an implementation of the first fluid flow component 1022) is positioned to connect the nozzle assembly 1145 to the target material fluid reservoir 1126. The adapter 1122 includes an interior passageway 1122$p$ and the fluid reservoir 1126 includes an interior passageway 1126$p$ that permit the target material fluid 1132 to pass. The inner opening 1106 of the gasket 1105 extends the axial flow path 1130 of either or both of the adapter 1122 and the fluid reservoir 1126. That is, the axial flow path 1130 extends between the adapter 1122 and the fluid reservoir 1126 by way of the opening 1106 of the gasket 1105.

The nozzle assembly 1145 includes a capillary 1147 that receives the molten target material fluid 1132 and thereby forms a stream of targets 1150. Each target 1150 is allowed to drift along a trajectory to the plasma formation location 1154 within a vacuum chamber (such as the vacuum chamber 956). In some implementations, the target 1150 can be directed to the plasma formation location 1154 by force. The plasma formation location 1154 can receive at least one light beam 1158 that has been generated by an optical source (such as the optical source 959). An interaction between the light beam 1158 and the target material in the target 1150 produces a plasma that emits EUV light, as discussed above with reference to FIG. 9.

As also discussed above, the target material fluid 1132 can include water, tin, lithium, xenon, and/or any material that, when converted to a plasma state, has an emission line in the EUV range. For example, the target material can be the element tin, which can be used as pure tin (Sn); as a tin compound, for example, SnBr4, SnBr2, SnH4; as a tin alloy, for example, tin-gallium alloys, tin-indium alloys, tin-indium-gallium alloys, or any combination of these alloys.

The adapter 1122 can be made of a material that is compatible with the material of the target material fluid 1132. Thus, in implementations in which the target material fluid 1132 includes tin, a tin alloy, or a tin compound, the adapter 1122 can be made of molybdenum or a molybdenum compound such as molybdenum rhenium.

Like the gasket 1005, the inner opening 1106 of the gasket 1105 is stepped or tiered so that it has two distinct inner diameters ID1105_1 and ID1105_2. The smaller diameter ID1105_1 of the inner opening 1106 of the gasket 1105 should be large enough to extend the axial flow path 1130 and the larger diameter ID1105_2 of the inner opening 1106 of the gasket 1105 should be large enough to accommodate the flow restrictor 1160 as an insert therein. Thus, the smaller diameter ID1105_1 of the inner opening 1106 is large enough to enable the fluid 1132 to pass through the gasket 1105 (that is, through the inner opening 1106 of the gasket 1105). The gasket 1105 includes a pair of opposite facing outer planar surfaces 1108a, 1108b (similar to the surfaces 208a, 208b of the gasket 205). Additionally, each of the adapter 1122 and the wall of the target material fluid reservoir 1126 includes a respective annular protrusion 1123 and 1127 (similar to the annular protrusions 223, 227 of the first and second fluid components 222, 226 discussed above). The gasket 1105 therefore seals the adapter 1122 and the wall of the target material fluid reservoir 1126 using the pressure energized functionality discussed in detail above.

The inner opening 1162 of the flow restrictor 1160 has a diameter (in the XY plane) that is smaller than both of the diameters ID1105_1 and ID1105_2 of the inner opening 1106 of the gasket 1105. Additionally, the smaller diameter ID1105_1 of the inner opening 1106 of the gasket 1105 is at least as large as the diameter of the restricted inner opening 1162, at least as large as the diameter of the interior passageway 1122p of the adapter 1122, and also small enough to enable axial support for the flow restrictor 1160 at the XY interface 1164 between the gasket 1105 and the flow restrictor 1160.

The diameter of the restricted inner opening 1162 should be large enough to pass the volume or mass flow of the target material fluid 1132, but also small enough to restrict the flow pressure of the target material fluid 1132 from the target material fluid reservoir 1126 to the nozzle assembly 1145 (by way of the adapter 1122) when flow pressure restriction is needed. In particular, the diameter of the restricted inner opening 1162 should be at least a tenth of the diameter of the interior passageway 1122p of the adapter 1122 (the element downstream of the flow restrictor 1160). The capillary 1147 can taper from a larger radial extent (of about 300 or about 500 μm) at the side facing the flow restrictor 1160 to a smaller radial extent (of about 3 μm) where the targets 1150 are released as a stream toward the plasma formation location 1154. The diameter of the restricted inner opening 1162 should be smaller than the larger radial extent of the capillary 1147 but also larger than the smaller radial extent of the capillary 1147. Moreover, for some implementations in which the target material fluid 1132 includes tin or a tin compound, the diameter of the restricted inner opening 1162 can be on the order of tens of microns, or about 70 μm.

The flow restrictor 1160 is annularly shaped like the gasket 1105. And, as discussed above, the flow restrictor 1160 is made of a material that is compatible with the target material fluid 1132. Thus, in implementations in which the target material fluid 1132 includes tin or tin compounds, the flow restrictor 1160 can be made of tantalum, boron carbide, various metals with tin-phobic coatings, other refractory metals, polyimide or other suitable materials.

The flow restrictor 1160 can advantageously be made of a tin-phobic material to enable easy separation from solid tin should solid tin form in the coupling apparatus 1000. The diameter of restricted inner opening 1162 is chosen to enable easy separation of the adapter 1122 and the target material fluid reservoir 1126 whenever solid tin forms in the axial flow path 1130 of the coupling apparatus 1000. In particular, in order to separate the adapter 1122 from the target material fluid reservoir 1126, the entire fluid line at the coupling apparatus 1100 is cooled, and the target material fluid 1132 is cooled to the point at which is freezes. Because the flow restrictor 1160 is made of a target material-phobic material, the target material fluid 1132 will not stick to the flow restrictor 1160 when target material fluid 1132 freezes. Moreover, because the inner opening 1162 is so small, any frozen target material fluid 1132 that remains within the inner opening 1162 provides a pinch location that is easy to break. This enables the separation of the adapter 1122 and the target material fluid reservoir 1126 at the coupling apparatus 1100 without the need for reverse flow or push-back of the target material fluid 1132 from the coupling apparatus 1100 prior to cooling the fluid line.

Referring to FIG. 12A, during normal operation, the flow restrictor 1160 is seated in the gasket 1105, and held in its axial position by the pressure of the flow of the target material fluid 1132 along a direction from the fluid reservoir 1126 to the adapter 1122. This pressure is applied to the flow restrictor 1160 to cause it to gently push against the interface 1164. Additionally, the flow restrictor 1160 is held in its radial position by the inner wall of the gasket 1105 (the wall that has the larger diameter ID1105_2). Because there is no active sealing mechanism between the flow restrictor 1160 and the gasket 1105, and only the gentle push against the interface 1164, the target material fluid 1132 is free to pass not only through the restricted inner opening 1162 (the path labeled 1166) but also in the gap between the flow restrictor 1160 and the gasket 1105 as shown by the arrows labeled 1168. At this point in time, flow is not significantly restricted. The target material fluid 1132 is prevented from passing between the gasket 1105 and the walls of the fluid reservoir 1126 due to the seal formed between the annular protrusion 1127 and the outer planar surface 1108*b* of the gasket 1105, and the target material fluid 1132 is prevented from passing between the gasket 1105 and the walls of the adapter 1122 due to the seal formed between the annular protrusion 1123 and the outer planar surface 1108*a* of the gasket 1105.

Referring to FIG. 12B, if a rupture occurs downstream of the flow restrictor 1160 (toward the adapter 1122), then the flow restrictor 1160 performs a flow restricting operation. A rupture can happen when one or more components downstream of the flow restrictor 1160 fail. For example, if a component within the nozzle assembly 1145 fractures and breaks a hermetic seal, then the flow restrictor 1160 feels a much greater force from the pressure of the target material fluid 1132 upstream from the flow restritor 1160 as the target material fluid 1132 downstream of the flow restrictor 1160 rushes to the location of the fracture/break/crack. Such pressure creates an additional (and hermetic) seal between the flow restrictor 1160 and the gasket 1105, specifically at the interface 1164. This hermetic seal is formed at least in part because the gasket 1105 is made of a material that is compliant, deformable, and soft enough to compress as the force is applied from the flow restrictor 1160 as the pressure of the target material fluid 1132 is increased. The hermetic seal is strong enough to prevent the target material fluid 1132 from flowing along the path 1168 between the flow restrictor 1160 and the gasket 1105. Thus, the target material fluid 1132 is forced to flow through the restricted inner opening 1162 along the path 1166 only. Because the inner opening 1162 is so small in extent, the target material fluid 1132 exits the flow restrictor 1160 with much less pressure on its way toward the adapter 1122 and the capillary 1147. The capillary 1147 is thereby protected from unwanted high forces that would otherwise be applied by the target material fluid 1132 if no flow restrictor 1160 were present. Moreover, at this time, a separate leak sensor is triggered from the flow of the target material fluid 1132 through the fractured component.

Figure 15:
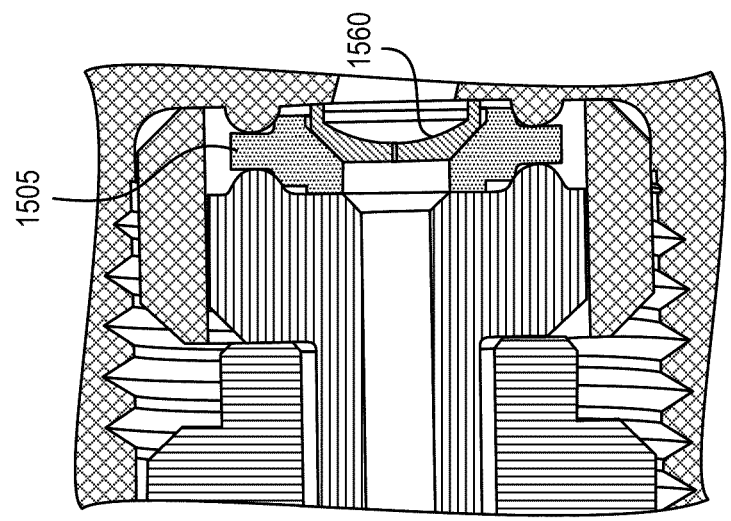
FIGS. 13-15 are side cross-sectional diagrams of different implementations of the flow restrictor and gasket of the flow restricting coupling apparatus of FIGS. 10-12B.
Figure 14:
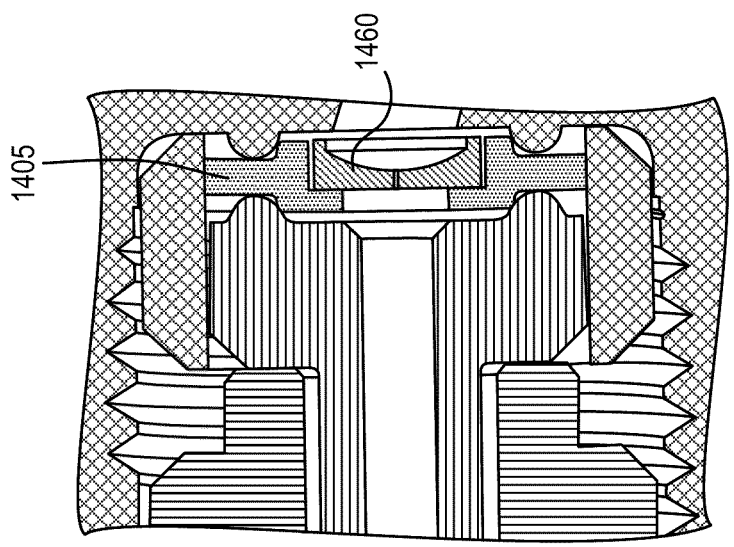
Figure 13:
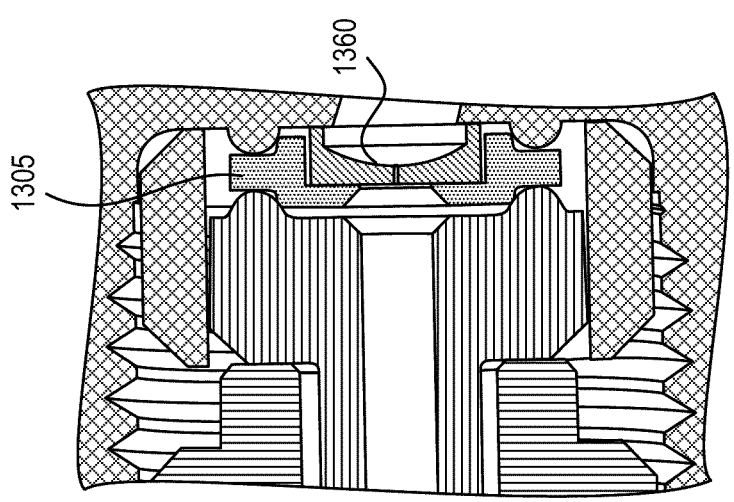

Referring to FIGS. 13-15, respective alternative implementations 1360, 1460, 1560 of the flow restrictor 1060 and respective alternative implementations 1305, 1405, 1505 of the gasket 1005 are shown. In FIGS. 13 and 14, the flow restrictor 1360/1460 and the gasket 1305/1405 interface at a right angled annular L-shaped edge. In FIG. 15, the flow restrictor 1560 and the gasket 1505 interface at an obtuse-shaped annular edge. These various alternative implementations operation functionally similarly to the flow restrictor 1160 and the gasket 1105 shown and discussed above.

Figure 16:
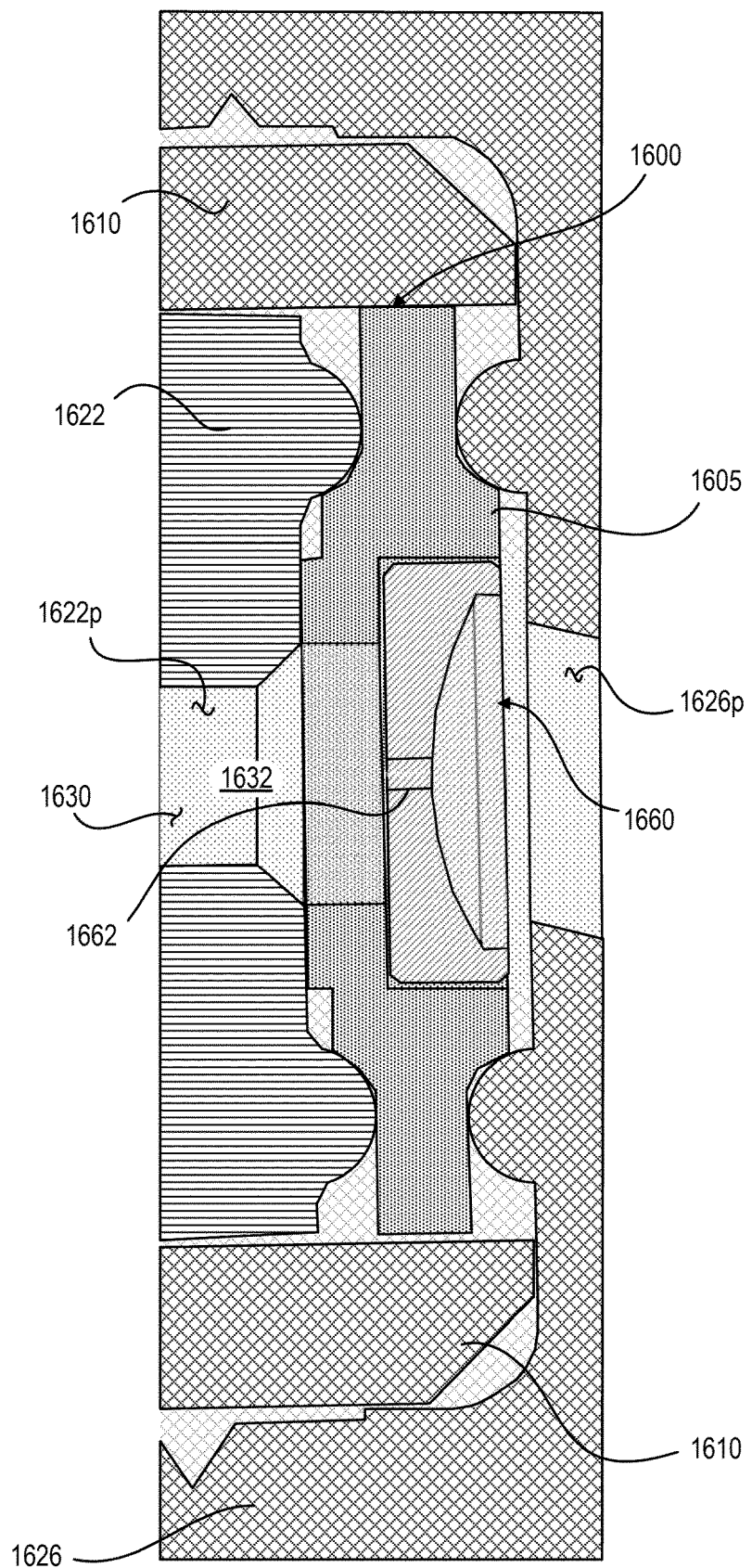
FIG. 16 is a side cross-sectional diagram of a detail of an implementation of the coupling apparatus of FIG. 10, in which the functional insert is a separating insert.

In the coupling apparatus 1660 of FIG. 16, a separating insert 1660 is seated within a gasket 1605 and support component 1610, and is positioned to couple first and second fluid flow components 1622, 1626. The target material fluid 1632 flows through interior passageways 1622*p*, 1626*p* of the respective first and second fluid flow components 1622, 1626, where the axial flow path 1630 extends between these interior passageways 1622*p*, 1626*p* and an inner opening 1622 of the functional insert 1660. The gasket 1605 is similar to the gasket 1105 and the support component 1610 is similar to the support component 1110. While the functional insert 1660 provides a separability functionality, the functional insert 1660 does not appreciably restrict flow of the target material fluid 1632.

In this implementation, the inner opening 1662 is designed to be large enough that flow of the target material fluid 1632 between the passageways 1622*p*, 1626*p* is not significantly restricted. Nevertheless, the inner opening 1662 should be small enough to facilitate separation between the first and second fluid flow components 1622, 1626. For example, the diameter of the inner opening 1662 can be on the order of about 1 mm. In other implementations the diameter of the inner opening 1662 can range between 0.5 to 1.5 mm. In particular, in order to separate the first fluid flow component 1622 from the second fluid flow component 1626, the entire fluid line at the coupling apparatus 1600 is cooled, and the target material fluid 1632 is cooled to the point at which is freezes. In this implementation, the insert 1660 is made of a target material-phobic material, and thus, the target material fluid 1632 freezes but does not substantially stick to the insert 1660 when the fluid line is cooled. Moreover, because the inner opening 1662 is still relatively small (compared to the size of the passageways 1622*p*, 1626*p*), any frozen target material fluid 1632 that remains within the inner opening 1662 provides a pinch or break location for the frozen target material fluid 1632, such pinch location being the location at which it is easy to break the frozen target material fluid 1632 without damaging the first and second fluid flow components 1622, 1626. This enables the separation of the first fluid flow component 1622 and the second fluid flow component 1626 at the coupling apparatus 1600 without the need for reverse flow or pushback of the target material fluid 1632 from the coupling apparatus 1600 prior to cooling the fluid line.

Figure 17:
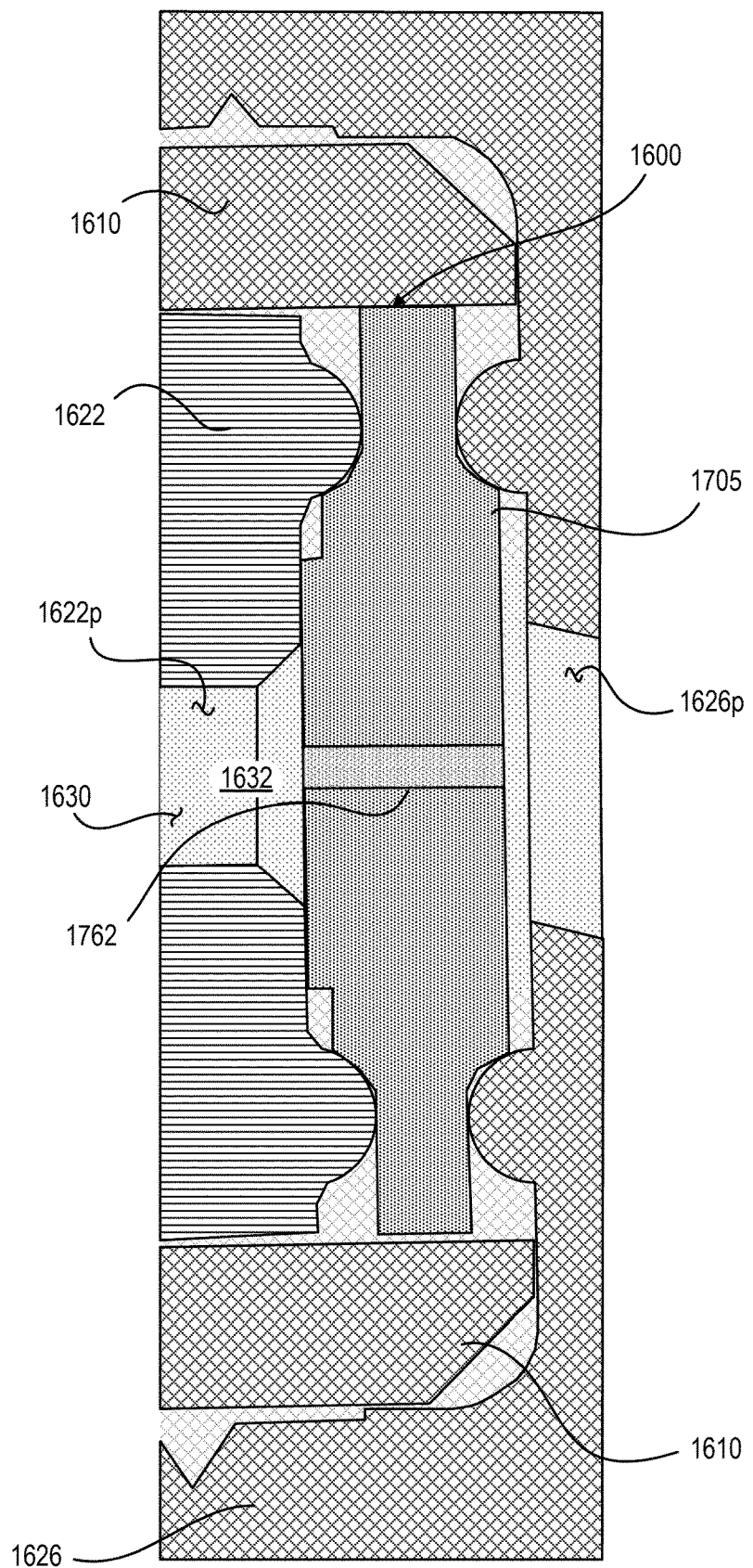
FIG. 17 is a side cross-sectional diagram of a detail of an implementation of the coupling apparatus of FIG. 10, in which the functional insert as a separating insert and the gasket are a unitary element.

In still other implementations, such as shown in FIG. 17, the gasket 1605 and the insert 1660 of FIG. 16 can be made as a unitary structure 1705 that is both compatible with the target material fluid 1632 and also is phobic relative to the target material fluid 1632. The unitary structure 1705 is a gasket having an inner opening 1762 that has a size similar to that of the inner opening 1662 of the insert 1660. Moreover, the gasket 1705 is made of a material that is phobic to the target material fluid 1632, and thus, the target material fluid 1632 does not substantially stick to the insert gasket 1705 when the fluid line is cooled and the target material fluid 1632 freezes.

The implementations can be further described using the following clauses

1. A target material supply apparatus comprising:
first and second fluid flow components that define an axial flow path when joined together, in which the axial flow path is between a source of target material fluid and a nozzle supply apparatus and is configured to pass the target material fluid toward the nozzle supply apparatus; and a coupling apparatus configured to seal a joint between the first and second fluid flow components, the coupling apparatus comprising a gasket having an annular shape defining an inner opening that is a part of the axial flow path when seated and sealed;
wherein, when the gasket is seated between the first and second fluid flow components to thereby seal the joint formed by attaching the first and second fluid flow components, pressure applied to the gasket from target material fluid traversing the gasket inner opening along the axial flow path improves the hermetic function of the seal at the joint.

2. The target material supply apparatus of clause 1, wherein the gasket is configured to be demountable from the joint without damaging the joint.

3. The target material supply apparatus of clause 1, wherein at least one surface of the gasket extending in a radial plane is configured to engage with a protrusion of the adjacent fluid flow component after an outer radial mating surface of the gasket has engaged with an inner radial mating surface of the adjacent fluid flow component.

4. The target material supply apparatus of clause 1, wherein the first fluid flow component is an adapter and the second fluid flow component is a target material fluid reservoir, the adapter being positioned between the target material fluid reservoir and the nozzle supply apparatus.

5. The target material supply apparatus of clause 4, wherein the adapter is made of molybdenum rhenium and the gasket is made of polyimide.

6. The target material supply apparatus of clause 1, further comprising a functional insert that is seated within the inner opening of the gasket, the functional insert including an inner opening that is part of the axial flow path, the functional insert inner opening having a diameter that is less than the diameter of the inner opening of the gasket.

7. The target material supply apparatus of clause 6, wherein the functional insert is made of a material that is compatible with the target material fluid.

8. The target material supply apparatus of clause 7, wherein the functional insert is a flow restrictor that is made of tantalum; tungsten; molybdenum; an alloy of tantalum, tungsten, or molybdenum; polyimide; or a refractory metal.

9. The target material supply apparatus of clause 7, wherein the functional insert is made of boron carbide or a metal coated with a tin-phobic material.

10. The target material supply apparatus of clause 7, wherein the target material fluid is molten tin.

11. The target material supply apparatus of clause 6, wherein the diameter of the inner opening of the gasket is at least as large as an inner opening of the adapter that defines the axial flow path, and small enough to axially support the functional insert therewithin.

12. The target material supply apparatus of clause 6, wherein the functional insert is a flow restrictor and the diameter of its inner opening is small enough to allow a restricted flow of target material fluid upon application of a flow pressure of the target material fluid that exceeds a threshold, is smaller than a diameter of the axial flow path, and is larger than the smallest diameter of a flow path of the nozzle supply apparatus.

13. The target material supply apparatus of clause 6, wherein the functional insert is a flow restrictor,
the first fluid flow component is an adapter, and the second fluid flow component is a target material fluid reservoir, the adapter being positioned between the target material fluid reservoir and the nozzle supply apparatus.

14. A coupling apparatus configured to seal a joint between two fluid flow components that, when joined, define an axial flow path through which a fluid can traverse, the coupling apparatus comprising:
a gasket having an annular shape that defines an inner opening having a diameter taken along a radial plane that is perpendicular to the axial flow path, the inner opening diameter of the gasket being large enough to enable fluid to pass through the gasket, wherein the gasket inner opening extends the axial flow path; and
a support component in which the gasket is arranged, the support component having an annular shape that defines an inner opening having a diameter taken along the radial plane, the inner opening diameter of the support component being larger than an outer diameter of the gasket;
wherein, when the gasket is seated between the two fluid flow components to thereby seal the joint formed by attaching the two fluid flow components, pressure applied to the gasket from fluid traversing the gasket inner opening along the axial flow path improves the hermetic function of the seal at the joint.

15. The coupling apparatus of clause 14, wherein the gasket extends the axial flow path between the two fluid flow components.

16. The coupling apparatus of clause 14, wherein the gasket has a cross-sectional shape having an axial extent that is closest to the axial flow path that is greater than an axial extent that is farthest from the axial flow path.

17. The coupling apparatus of clause 14, wherein the support component is a part of one or more of the fluid flow components or a separate support ring.

18. The coupling apparatus of clause 14, wherein the support component is made of a material that is harder than the material of the gasket.

19. The coupling apparatus of clause 14, wherein a cross-sectional shape of the gasket is T-shaped.

20. The coupling apparatus of clause 14, wherein the gasket is made of a polyimide.

21. The coupling apparatus of clause 14, wherein, as the joint between the fluid flow components is tightened, the joint seal is initially formed between an inner radial mating surface of at least one of the fluid flow components and an outer radial mating surface of the gasket prior to the joint seal being formed along the axial direction between the fluid flow components and the gasket.

22. The coupling apparatus of clause 14, wherein the gasket is axially symmetric.

23. The coupling apparatus of clause 14, wherein:
the two fluid flow components are tubes that both define respective inner diameters that define the axial flow path; or
a first of the fluid flow components is a tube that defines the inner diameter that defines the axial flow path and a second of the fluid flow components is a fluid stop device that is configured to prevent fluid from passing.

24. The coupling apparatus of clause 14, wherein a first fluid flow component is an adapter and a second fluid flow component is a target material fluid reservoir, the adapter being positioned between the target material fluid reservoir and a nozzle supply apparatus.

25. The coupling apparatus of clause 24, wherein the adapter is made of molybdenum rhenium and the gasket is made of polyimide.

26. The coupling apparatus of clause 14, further comprising a functional insert that is seated within the inner opening of the gasket, the functional insert including an inner opening that is part of the axial flow path, the functional insert inner opening having a diameter that is less than the diameter of the inner opening of the gasket.

27. The coupling apparatus of clause 26, wherein the functional insert is made of a material that is compatible with the target material fluid.

28. The coupling apparatus of clause 27, wherein the functional insert is made of tantalum; tungsten; molybdenum; an alloy of tantalum, tungsten, or molybdenum; a refractory metal; or polyimide.

29. The coupling apparatus of clause 27, wherein the functional insert is made of boron carbide or a metal coated with a tin-phobic material.

30. The coupling apparatus of clause 26, wherein the diameter of the inner opening of the gasket is at least as large as an inner opening of the adapter that defines the axial flow path, and small enough to axially support the functional insert therewithin.

31. The coupling apparatus of clause 26, wherein the functional insert is a flow restrictor, and diameter of its inner opening is small enough to allow a restricted flow of target material fluid upon application of a flow pressure of the target material fluid that exceeds a threshold, is smaller than a diameter of the axial flow path, and is larger than the smallest diameter of a flow path of the nozzle supply apparatus.

32. The coupling apparatus of clause 26, wherein the functional insert is a flow restrictor, the first fluid flow component is an adapter, and the second fluid flow component is a target material fluid reservoir, the adapter being positioned between the target material fluid reservoir and the nozzle supply apparatus.

33. A target material supply apparatus comprising:
first and second fluid flow components that define an axial flow path when joined together, in which the axial flow path is between a source of target material fluid and a nozzle supply apparatus and is configured to pass the target material fluid toward the nozzle supply apparatus; and
a coupling apparatus configured to seal the joint between the first and second fluid flow components, the coupling apparatus comprising a gasket made of a material other than metal or metal alloys and is compatible with and inert to the target material fluid.

34. The target material supply apparatus of clause 33, wherein the target material fluid includes molten tin and the gasket is made of polyimide.

35. The target material supply apparatus of clause 33, wherein the gasket is made of a material that retains its sealing properties at temperatures greater than 200° C. and at fluid flow pressures greater than 3000 PSI.

36. The target material supply apparatus of clause 33, wherein the gasket is made of a material that retains its sealing properties at fluid flow pressures greater than 10,000 PSI.

37. The target material supply apparatus of clause 33, wherein the gasket is seated between the first and second fluid flow components such that the seal formed by the gasket improves as the fluid flow pressure is increased.

38. The target material supply apparatus of clause 33, further comprising a support component within which the gasket is arranged, the support component configured to provide a hard stop along the direction of the axial flow path.

39. The target material supply apparatus of clause 38, wherein the support component has a coefficient of thermal expansion that is compatible with the coefficient of thermal expansion of the material of the first and second fluid flow components.

40. The target material supply apparatus of clause 33, further comprising a support component within which the gasket is arranged, the support component configured to prevent the gasket from extruding away from the axial flow path and failing to maintain the seal, the support component being made of a material that is stronger than the material of the gasket.

41. The target material supply apparatus of clause 33, further comprising a support component within which the gasket is arranged, the support component being made of a nickel-cobalt ferrous alloy or an alloy of one or more of: nickel, cobalt, iron, titanium, aluminum, magnesium, copper, molybdenum, and tungsten.

42. The target material supply apparatus of clause 33, further comprising a support component within which the gasket is arranged, the support component being made of a material that has a stiffness that is 2-100 times greater than the stiffness of the material of the gasket.

43. The target material supply apparatus of clause 33, wherein a first fluid flow component is an adapter and a second fluid flow component is a target material fluid reservoir, the adapter being positioned between the target material fluid reservoir and the nozzle supply apparatus.

44. The target material supply apparatus of clause 43, wherein the adapter is made of molybdenum rhenium and the gasket is made of polyimide.

45. The target material supply apparatus of clause 33, further comprising a functional insert that is seated within the inner opening of the gasket, the functional insert including an inner opening that is part of the axial flow path, the functional insert inner opening having a diameter that is less than the diameter of the inner opening of the gasket.

46. The target material supply apparatus of clause 45, wherein the functional insert is made of a material that is compatible with the target material fluid.

47. The target material supply apparatus of clause 46, wherein the functional insert is made of tantalum; tungsten; molybdenum; an alloy of tantalum, tungsten, or molybdenum; a refractory metal; or polyimide.

48. The target material supply apparatus of clause 46, wherein the functional insert is made of boron carbide or a metal coated with a tin-phobic material.

49. The target material supply apparatus of clause 45, wherein the diameter of the inner opening of the gasket is at least as large as an inner opening of the adapter that defines the axial flow path, and small enough to axially support the functional insert therewithin.

50. The target material supply apparatus of clause 45, wherein the functional insert is a flow restrictor, and the diameter of its inner opening is small enough to allow a restricted flow of target material fluid upon application of a flow pressure of the target material fluid that exceeds a threshold, is smaller than a diameter of the axial flow path, and is larger than the smallest diameter of a flow path of the nozzle supply apparatus.

51. The target material supply apparatus of clause 45, wherein the first fluid flow component is an adapter and the second fluid flow component is a target material fluid reservoir, the adapter being positioned between the target material fluid reservoir and the nozzle supply apparatus.

52. A coupling apparatus configured to seal a joint between a reservoir that holds a target material fluid and an adapter configured to fluidly connect the reservoir to a nozzle supply apparatus, the coupling apparatus extending an axial flow path through which the target material fluid can traverse from the reservoir to the nozzle supply apparatus, the coupling apparatus comprising:
  a gasket having an annular shape that defines an inner opening having a diameter taken along a radial plane that is perpendicular to the axial flow path, the inner opening diameter of the gasket being large enough to enable fluid to pass through the gasket, wherein the gasket inner opening extends the axial flow path; and
  a functional insert that is seated within the inner opening of the gasket, the functional insert including an inner opening that is part of the axial flow path, the functional insert inner opening having a diameter that is less than the diameter of the inner opening of the gasket;
  wherein, when the gasket is seated between the reservoir and the adapter to thereby seal the joint formed by attaching the reservoir and the adapter, pressure applied to the gasket from fluid traversing the gasket inner opening along the axial flow path improves the hermetic function of the seal at the joint.

53. The coupling apparatus of clause 52, further comprising a support component in which the gasket is arranged, the support component having an annular shape that defines an inner opening having a diameter taken along the radial plane, the inner opening diameter of the support component being larger than an outer diameter of the gasket.

54. A separating coupling apparatus configured to seal a joint between first and second fluid flow components, the separating coupling apparatus extending an axial flow path through which a target material fluid can traverse from a reservoir to a nozzle supply apparatus, the separating coupling apparatus comprising:
  a separating gasket having an annular shape that defines an inner opening having a diameter taken along a radial plane that is perpendicular to the axial flow path, the inner opening diameter of the separating gasket being large enough to enable fluid to pass through the separating gasket, wherein the gasket inner opening extends the axial flow path, the separating gasket being made of a material that is phobic to and compatible with the target material fluid;
  wherein, when the separating gasket is seated between the first and second fluid flow components to thereby seal the joint formed by attaching the first fluid flow component and the second fluid flow component, pressure applied to the separating gasket from fluid traversing the gasket inner opening along the axial flow path improves the hermetic function of the seal at the joint.

The invention claimed is:

1. A target material supply apparatus comprising:
  first and second fluid flow components that define an axial flow path when joined together, in which the axial flow path is between a source of target material fluid and a nozzle supply apparatus and is configured to pass the target material fluid toward the nozzle supply apparatus, each of the first and second fluid components having inner radial mating surfaces; and
a coupling apparatus configured to seal a joint between the first and second fluid flow components, the coupling apparatus comprising a gasket having an annular shape defining an inner opening that is a part of the axial flow path when seated and sealed, the gasket including outer radial mating surfaces;
wherein, when the gasket is seated between the first and second fluid flow components to thereby seal the joint formed by attaching the first and second fluid flow components, pressure applied to the gasket from target material fluid traversing the gasket inner opening along the axial flow path improves the hermetic function of the seal at the joint at least in part at interfaces formed from interactions between inner radial mating surfaces of the first and second fluid components with respective outer radial mating surfaces of the gasket.

2. The target material supply apparatus of claim 1, wherein each inner radial mating surface is formed at a protrusion of the first and second fluid component, and at least one surface of the gasket extending in a radial plane is configured to engage with the protrusion of the adjacent fluid flow component after the outer radial mating surface of the gasket has engaged with the inner radial mating surface of the adjacent fluid flow component.

3. The target material supply apparatus of claim 1, further comprising a functional insert that is seated within the inner opening of the gasket, the functional insert including an inner opening that is part of the axial flow path, the functional insert inner opening having a diameter that is less than the diameter of the inner opening of the gasket.

4. The target material supply apparatus of claim 3, wherein the functional insert is a flow restrictor that is made of tantalum; tungsten; molybdenum; an alloy of tantalum, tungsten, or molybdenum; polyimide; or a refractory metal.

5. The target material supply apparatus of claim 3, wherein the functional insert is made of boron carbide or a metal coated with a tin-phobic material.

6. The target material supply apparatus of claim 3, wherein the functional insert is a flow restrictor and the diameter of its inner opening is small enough to allow a restricted flow of target material fluid upon application of a flow pressure of the target material fluid that exceeds a threshold, is smaller than a diameter of the axial flow path, and is larger than the smallest diameter of a flow path of the nozzle supply apparatus.

7. A coupling apparatus configured to seal a joint between two fluid flow components that, when joined, define an axial flow path through which a fluid can traverse, the coupling apparatus comprising:
a gasket having an annular shape that defines an inner opening having a diameter taken along a radial plane that is perpendicular to the axial flow path, the inner opening diameter of the gasket being large enough to enable fluid to pass through the gasket, wherein the gasket inner opening extends the axial flow path; and
a support component in which the gasket is arranged, the support component having an annular shape that defines an inner opening having a diameter taken along the radial plane, the inner opening diameter of the support component being larger than an outer diameter of the gasket;
wherein, when the gasket is seated between the two fluid flow components to thereby seal the joint formed by attaching the two fluid flow components, pressure applied to the gasket from fluid traversing the gasket inner opening along the axial flow path improves the hermetic function of the seal at the joint;
wherein, as the joint between the fluid flow components is tightened, the joint seal is initially formed between an inner radial mating surface of at least one of the fluid flow components and an outer radial mating surface of the gasket prior to the joint seal being formed along the axial direction between the fluid flow components and the gasket.

8. The coupling apparatus of claim 7, wherein the gasket has a cross-sectional shape having an axial extent that is closest to the axial flow path that is greater than an axial extent that is farthest from the axial flow path.

9. The coupling apparatus of claim 7, wherein a cross-sectional shape of the gasket is T-shaped.

10. The coupling apparatus of claim 7, wherein:
the two fluid flow components are tubes that both define respective inner diameters that define the axial flow path; or
a first of the fluid flow components is a tube that defines the inner diameter that defines the axial flow path and a second of the fluid flow components is a fluid stop device that is configured to prevent fluid from passing.

11. The coupling apparatus of claim 7, wherein a first fluid flow component is an adapter and a second fluid flow component is a target material fluid reservoir, the adapter being positioned between the target material fluid reservoir and a nozzle supply apparatus.

12. The coupling apparatus of claim 11, wherein the adapter is made of molybdenum rhenium and the gasket is made of polyimide.

13. The coupling apparatus of claim 7, further comprising a functional insert that is seated within the inner opening of the gasket, the functional insert including an inner opening that is part of the axial flow path, the functional insert inner opening having a diameter that is less than the diameter of the inner opening of the gasket.

14. The coupling apparatus of claim 13, wherein the functional insert is made of boron carbide or a metal coated with a tin-phobic material.

15. The coupling apparatus of claim 13, wherein the functional insert is a flow restrictor, and diameter of its inner opening is small enough to allow a restricted flow of target material fluid upon application of a flow pressure of the target material fluid that exceeds a threshold, is smaller than a diameter of the axial flow path, and is larger than the smallest diameter of a flow path of the nozzle supply apparatus.

16. A target material supply apparatus comprising:
first and second fluid flow components that define an axial flow path when joined together, in which the axial flow path is between a source of target material fluid and a nozzle supply apparatus and is configured to pass the target material fluid toward the nozzle supply apparatus;
a coupling apparatus configured to seal the joint between the first and second fluid flow components, the coupling apparatus comprising a gasket made of a material other than metal or metal alloys and is compatible with and inert to the target material fluid; and
a support component within which the gasket is arranged, the support component configured to provide a hard stop along the direction of the axial flow path.

17. The target material supply apparatus of claim 16, wherein the gasket is seated between the first and second fluid flow components such that the seal formed by the gasket improves as the fluid flow pressure is increased.

18. The target material supply apparatus of claim 16, wherein the support component is made of a nickel-cobalt ferrous alloy or an alloy of one or more of: nickel, cobalt, iron, titanium, aluminum, magnesium, copper, molybdenum, and tungsten.

19. The target material supply apparatus of claim 16, wherein the support component is made of a material that has a stiffness that is 2-100 times greater than the stiffness of the material of the gasket.

20. The target material supply apparatus of claim 16, further comprising a functional insert that is seated within the inner opening of the gasket, the functional insert including an inner opening that is part of the axial flow path, the functional insert inner opening having a diameter that is less than the diameter of the inner opening of the gasket.

21. The target material supply apparatus of claim 20, wherein the functional insert is made of boron carbide or a metal coated with a tin-phobic material.

22. The target material supply apparatus of claim 20, wherein the functional insert is a flow restrictor, and the diameter of its inner opening is small enough to allow a restricted flow of target material fluid upon application of a flow pressure of the target material fluid that exceeds a threshold, is smaller than a diameter of the axial flow path, and is larger than the smallest diameter of a flow path of the nozzle supply apparatus.

23. A coupling apparatus configured to seal a joint between a reservoir that holds a target material fluid and an adapter configured to fluidly connect the reservoir to a nozzle supply apparatus, the coupling apparatus extending an axial flow path through which the target material fluid can traverse from the reservoir to the nozzle supply apparatus, the coupling apparatus comprising:

a gasket having an annular shape that defines an inner opening having a diameter taken along a radial plane that is perpendicular to the axial flow path, the inner opening diameter of the gasket being large enough to enable fluid to pass through the gasket, wherein the gasket inner opening extends the axial flow path; and a functional insert that is seated within the inner opening of the gasket, the functional insert including an inner opening that is part of the axial flow path, the functional insert inner opening having a diameter that is less than the diameter of the inner opening of the gasket;

wherein, when the gasket is seated between the reservoir and the adapter to thereby seal the joint formed by attaching the reservoir and the adapter, pressure applied to the gasket from fluid traversing the gasket inner opening along the axial flow path improves the hermetic function of the seal at the joint.

24. The coupling apparatus of claim 23, wherein the functional insert is a flow restrictor that is made of tantalum; tungsten; molybdenum; an alloy of tantalum, tungsten, or molybdenum; polyimide; a refractory metal; boron carbide; or a metal coated with a tin-phobic material.

25. The coupling apparatus of claim 23, wherein the functional insert is a flow restrictor and the diameter of its inner opening is small enough to allow a restricted flow of target material fluid upon application of a flow pressure of the target material fluid that exceeds a threshold, is smaller than a diameter of the axial flow path, and is larger than the smallest diameter of a flow path of the nozzle supply apparatus.

* * * * *